United States Patent
Yamamoto et al.

(10) Patent No.: US 8,408,515 B2
(45) Date of Patent: Apr. 2, 2013

(54) PRESSURE-REDUCING VALVE

(75) Inventors: Hiroaki Yamamoto, Kakuda (JP); Yutaka Chiba, Kakuda (JP); Yoshio Saito, Kakuda (JP); Yoji Nakajima, Kakuda (JP)

(73) Assignee: Keihin Corporation, Tokyo (JP)

( * ) Notice: Subject to any disclaimer, the term of this patent is extended or adjusted under 35 U.S.C. 154(b) by 400 days.

(21) Appl. No.: 12/675,380

(22) PCT Filed: Jul. 8, 2008

(86) PCT No.: PCT/JP2008/062338
§ 371 (c)(1),
(2), (4) Date: Feb. 25, 2010

(87) PCT Pub. No.: WO2009/028265

PCT Pub. Date: Mar. 5, 2009

(65) Prior Publication Data
US 2010/0224806 A1 Sep. 9, 2010

(30) Foreign Application Priority Data
Aug. 29, 2007 (JP) ................................. 2007-222417

(51) Int. Cl.
*F16K 31/00* (2006.01)
(52) U.S. Cl. ..................... 251/61.5; 251/61.2; 251/335.2
(58) Field of Classification Search .................... 251/61, 251/61.2, 61.3, 61.5, 331, 335.2; 92/98 R
See application file for complete search history.

(56) References Cited

U.S. PATENT DOCUMENTS

| | | | | |
|---|---|---|---|---|
| 4,038,506 A * | 7/1977 | Filip | ............................ | 200/83 J |
| 4,666,378 A * | 5/1987 | Ogawa | ........................... | 417/571 |
| 5,002,086 A * | 3/1991 | Linder et al. | ................... | 137/312 |
| 5,186,615 A * | 2/1993 | Karliner | ......................... | 417/387 |
| 5,353,688 A * | 10/1994 | Pierce et al. | ....................... | 92/63 |
| 5,765,466 A * | 6/1998 | Plantan et al. | ................. | 92/98 R |
| 5,836,571 A * | 11/1998 | Streitman et al. | ............. | 251/331 |
| 5,992,297 A * | 11/1999 | Plantan et al. | ................. | 92/98 R |
| 6,581,631 B2 * | 6/2003 | Tomczak et al. | .............. | 137/510 |
| 6,694,866 B2 * | 2/2004 | Smith et al. | .................... | 92/98 R |
| 6,988,442 B2 * | 1/2006 | Fisher | ........................... | 92/98 R |
| 2009/0152486 A1 * | 6/2009 | Bong et al. | ................ | 251/129.01 |

FOREIGN PATENT DOCUMENTS

| | | |
|---|---|---|
| JP | 50-144159 | 11/1975 |
| JP | 3-24369 A | 2/1991 |
| JP | 5-75558 U | 10/1993 |
| JP | 3060222 U | 5/1999 |
| JP | 2002-181208 A | 6/2002 |
| JP | 2006-318339 A | 11/2006 |

* cited by examiner

*Primary Examiner* — John K Fristoe, Jr.
*Assistant Examiner* — Umashankar Venkatesan
(74) *Attorney, Agent, or Firm* — Arent Fox LLP

(57) ABSTRACT

A pressure-reducing valve is provided in which a diaphragm rod connected to a valve body of a valve mechanism is connected to a central part of a diaphragm having its peripheral edge part clamped between a body and a diaphragm cover, wherein the diaphragm (28) is formed from a disk-shaped rubber sheet for which the sheet thickness of at least its peripheral edge part is uniform in the natural state, and in a state in which the diaphragm cover (17) is fixed to the body (16) so that the peripheral edge part of the diaphragm (28) is compressively held between a collar portion (17b) of the diaphragm cover (17) and a clamping face (91) of the body (16), a portion having, of the gap between the collar portion (17b) and the clamping face (91), a minimum gap is positioned further inward in the radial direction of the diaphragm (28) than a portion having a maximum gap. This enables the sealing properties and the pull-out resistance for the diaphragm to be guaranteed while achieving a reduction in weight and a reduction in cost.

5 Claims, 14 Drawing Sheets

PRESSURE-REDUCING VALVE

CROSS-REFERENCED TO RELATED APPLICATION

This application is a National Stage entry of International Application No. PCT/JP2008/062338, filed Jul. 8, 2008, which claims priority to Japanese Patent Application No. 2007-222417 filed Aug. 29, 2007, the disclosure of the prior applications are incorporated in their entirety by reference.

TECHNICAL FIELD

The present invention relates to a pressure-reducing valve in which a peripheral edge part of a diaphragm is clamped between a body housing a valve mechanism and a diaphragm cover fixed to the body, the diaphragm forming a pressure action chamber between itself and the body and forming a spring chamber between itself and the diaphragm cover, a spring housed in the spring chamber is provided in a compressed state between the diaphragm cover and the diaphragm, and a diaphragm rod connected to a central part of the diaphragm is provided so as to be connected to a valve body of the valve mechanism.

BACKGROUND ART

A pressure-reducing valve in which a peripheral edge part of a diaphragm is clamped between a partition wall member forming part of a body and a bottomed cylindrical diaphragm cover formed by secondary detailing after molding by die-casting, etc. and fixed to the body is known from Patent Publication 1.
Patent Publication 1: Japanese Patent Application Laid-open No. 2002-181208

DISCLOSURE OF INVENTION

Problems to be Solved by the Invention

The diaphragm of the arrangement disclosed in Patent Publication 1 has a ring-shaped outer peripheral seal portion fitted into an annular groove of the partition wall member and clamped between the partition wall member and the diaphragm cover, and a cylindrical inner peripheral seal portion disposed in a central part in order for a diaphragm rod to be passed through and connected to, the outer peripheral seal portion and the inner peripheral seal portion being formed so as to be thicker than other portions of the diaphragm, thus incurring an increase in cost.

Reducing the cost by using a diaphragm formed from a disk-shaped rubber sheet in which the sheet thickness of a seal portion is uniform in the natural state could be considered, but in this case there is the problem of ensuring the sealing characteristics and the pull-out resistance for the diaphragm.

The present invention has been accomplished in the light of such circumstances, and it is an object thereof to provide a pressure-reducing valve for which a reduction in weight and a reduction in cost are achieved by using a diaphragm formed from a disk-shaped rubber sheet in which the sheet thickness of at least a seal portion is uniform in the natural state and for which the sealing properties and the pull-out resistance for the diaphragm are ensured.

Means for Solving the Problems

In order to attain the above object, according to a first aspect of the present invention, there is provided a pressure-reducing valve in which a peripheral edge part of a diaphragm is clamped between a body housing a valve mechanism and a diaphragm cover fixed to the body. The diaphragm forms a pressure action chamber between itself and the body and forms a spring chamber between itself and the diaphragm cover. A spring housed in the spring chamber is provided in a compressed state between the diaphragm cover and the diaphragm. A diaphragm rod connected to a central part of the diaphragm is provided so as to be connected to a valve body of the valve mechanism. The diaphragm is formed from a disk-shaped rubber sheet for which the sheet thickness of at least its peripheral edge part is uniform in the natural state. The diaphragm cover integrally has a bottomed cylindrical portion having an end wall portion in an end part opposite the diaphragm and a collar portion protruding radially outward from an open end of the bottomed cylindrical portion. The diaphragm cover is fixed to the body so that the peripheral edge part of the diaphragm is compressively held between the collar portion and a clamping face formed on the body. A gap between the collar portion and the clamping face has a minimum gap portion and a maximum gap portion with the minimum gap portion being positioned radially inward of the maximum gap portion.

According to a second aspect of the present invention, in addition to the first aspect, the diaphragm cover is formed by press-forming of a metal sheet.

According to a third aspect of the present invention, in addition to the second aspect, the diaphragm cover is fixed to the body at a position further radially outward than the portion having the minimum gap portion so that the collar portion can resiliently deform so as to exhibit a resilient force for pressing the diaphragm against the clamping face side at the portion having the minimum gap portion.

According to a fourth aspect of the present invention, in addition to the second or third aspect, a flange portion forming the clamping face is provided on the body, the diaphragm cover integrally has a cylindrical positioning tubular portion provided so as to be connected to the outer periphery of the collar portion in order to carry out positioning of the diaphragm cover relative to the body by abutting against the outer periphery of the flange portion, and a tip portion of the positioning tubular portion is swaged radially inward so as to form an engagement portion that engages with the flange portion.

According to a fifth aspect of the present invention, in addition to the third aspect, the clamping face is formed so as to be flat along a plane perpendicular to the axis of the bottomed cylindrical portion of the diaphragm cover fixed to the body, and the collar portion is formed so as to be inclined so as to become further away from the clamping face in going radially outward.

According to a sixth aspect of the present invention, in addition to the fifth aspect, a groove having a substantially V-shaped cross-section is formed in at least one of the clamping face and a face of the collar portion on the clamping face side so that part of the diaphragm sinks into the groove.

According to a seventh aspect of the present invention, in addition to the sixth aspect, the groove is formed in at least one of the clamping face and a face of the collar portion on the clamping face side at the minimum gap portion.

According to an eighth aspect of the present invention, in addition to the second aspect, the bottomed cylindrical portion of the diaphragm cover integrally has the end wall portion, a cylindrical guide tube portion having one end provided so as to be connected to the outer periphery of the end wall portion in order to guide the outer periphery of an end part, on the end wall portion side, of the coil shaped spring, which is provided in a compressed state between the guide tube portion and the diaphragm, a tapered tubular portion formed in a tapered shape so that its diameter increases in going away from the end wall portion and provided so as to be connected to the other end of the guide tube portion, and a large diameter tubular portion having one end connected to a large diameter end of the tapered tubular portion and the other end connected to the collar portion.

In order to attain the above object, according to a ninth aspect of the present invention, there is provided a pressure-reducing valve in which a peripheral edge part of a diaphragm is clamped between a body housing a valve mechanism and a diaphragm cover fixed to the body. The diaphragm forms a pressure action chamber between itself and the body and forms a spring chamber between itself and the diaphragm cover. A spring housed in the spring chamber is provided in a compressed state between the diaphragm cover and the diaphragm. A diaphragm rod connected to a central part of the diaphragm is provided so as to be connected to a valve body of the valve mechanism. The diaphragm is formed from a disk-shaped rubber sheet for which the sheet thickness of at least its peripheral edge part is uniform in the natural state. The diaphragm cover integrally has a bottomed cylindrical portion having an end wall portion in an end part opposite the diaphragm and a collar portion protruding radially outward from an open end of the bottomed cylindrical portion. The body is formed with a clamping face holding the peripheral edge part of the diaphragm between itself and the collar portion. The clamping face has a chamfered portion positioned radially outward on an outer periphery of the clamping face with the peripheral edge end part of the diaphragm extending over the chamfered portion. The diaphragm cover is fixed to the body radially outward of the chamfered portion. The peripheral edge part of the diaphragm is compressively held between the clamping face and the collar portion at a position radially inward of the chamfered portion.

In order to attain the above object, according to a tenth aspect of the present invention, there is provided a pressure-reducing valve in which a peripheral edge part of a diaphragm is clamped between a body housing a valve mechanism and a diaphragm cover fixed to the body. The diaphragm forms a pressure action chamber between itself and the body and forms a spring chamber between itself and the diaphragm cover. A spring housed in the spring chamber is provided in a compressed state between the diaphragm cover and the diaphragm. A diaphragm rod connected to a central part of the diaphragm is provided so as to be connected to a valve body of the valve mechanism. The diaphragm is formed from a disk-shaped rubber sheet for which the sheet thickness of at least its central part is uniform in the natural state. The diaphragm rod is provided coaxially and integrally with a shaft portion passing through the central part of the diaphragm so as to form an annular step portion facing toward the diaphragm side on the pressure action chamber side. The diaphragm has its central part abutting against a first retainer on the pressure action chamber side, the first retainer being formed in a ring shape so as to allow the shaft portion to be passed through and having an annular seal member disposed between itself and the step portion. The diaphragm has its central part abutting against a second retainer on the spring chamber side, the second retainer being formed in a ring shape so as to allow the shaft portion to be passed through and clamping the central part of the diaphragm between itself and the first retainer. A nut is screwed around a male thread cut in the outer periphery of the shaft portion and holds the second retainer, the diaphragm, the first retainer, and the seal member between itself and the step portion. A gap between the first and second retainers has a minimum gap section and a maximum gap section which are defined by forming an inclined face on one of the first and second retainers, the minimum gap section being positioned further outward in the radial direction of the diaphragm than the maximum gap section. The diaphragm is compressed at the minimum gap section.

According to an eleventh aspect of the present invention, in addition to the tenth aspect, a groove having a substantially V-shaped cross-section is formed in at least one of a face of the first retainer on the diaphragm side and a face of the second retainer on the diaphragm side so that part of the diaphragm sinks into the groove.

According to a twelfth aspect of the present invention, in addition to the tenth or eleventh aspect, central parts of the first and second retainers, which are made of metal, are abutted against each other directly or via a metal washer at faces which extend orthogonally to an axis of the diaphragm rod.

Effects of the Invention

In accordance with the first aspect of the present invention, the diaphragm is formed from the disk-shaped rubber sheet, for which the sheet thickness of at least its peripheral edge part is uniform in the natural state, and the cost can be reduced. Moreover, although the peripheral edge part of the diaphragm has a flat shape, with regard to the gap between the clamping face of the body and the collar portion of the diaphragm cover, which compressively hold the peripheral edge part of the diaphragm therebetween, since a portion having a minimum gap is positioned further inward in the radial direction of the diaphragm than a portion having a maximum gap, it is possible to improve the sealing properties between the diaphragm and the collar portion and clamping face due to the diaphragm being compressed in the portion having a minimum gap by a relatively large load between the collar portion and the clamping face. Moreover, when a radially inward tensile load acts on the diaphragm peripheral edge part, in order for a portion of the diaphragm that is present further radially outward than the minimum gap portion to pass through the portion with the minimum gap between the collar portion and the clamping face, it is necessary for it to be compressed, thus improving the pull-out resistance load for the diaphragm.

In accordance with the second aspect of the present invention, by forming the diaphragm cover by press-forming of a metal sheet and achieving a reduction in size and weight of the diaphragm cover, the cost can be yet further reduced.

In accordance with the third aspect of the present invention, although there is a possibility that, if a rubber diaphragm deteriorates due to the influence of heat, etc. and the resilient force of the diaphragm is weakened, the sealing properties between the diaphragm and the collar portion and clamping face will deteriorate, since the collar portion in the portion having the minimum gap exhibits a resilient force so as to press the diaphragm toward the clamping face, the collar portion resiliently deforms toward the side closer to the body by an amount corresponding to a decrease in the resilient force of the diaphragm, thus guaranteeing the sealing properties.

In accordance with the fourth aspect of the present invention, since the flange portion is provided on the body so as to form the clamping face, the diaphragm cover integrally has the positioning tubular portion carrying out positioning of the diaphragm cover relative to the body by abutting against the outer periphery of the flange portion. The engagement portion is formed so as to engage with the flange portion as a result of the tip portion of the positioning tubular portion being swaged radially inward. Thus, when fixing the diaphragm cover to the body, it is unnecessary to use a component exclusively used therefor other than the diaphragm cover. This achieves a reduction in the number of components and a reduction in the cost and, moreover, compared with fixing by tightening, the number of assembly steps is reduced, thus enabling excellent productivity to be obtained.

In accordance with the fifth aspect of the present invention, it is possible to impart resilience by easily inclining the collar portion, and it is also easy to set the gap between the collar portion and the clamping face of the body so that the portion having the minimum gap portion is positioned further inward in the radial direction of the diaphragm than the portion having the maximum gap portion.

In accordance with the sixth aspect of the present invention, part of the diaphragm is made to sink into the groove, which has a substantially V-shaped cross-section and is formed in at least one of the clamping face and the face of the collar portion on the clamping face side, thus enhancing the sealing properties and the pull-out resistance load for the diaphragm.

In accordance with the seventh aspect of the present invention, since the groove formed in at least one of the clamping face and the face of the collar portion on the clamping face side is disposed at minimum gap portion, making part of the diaphragm more deeply sink into the groove enables the sealing properties and the pull-out resistance load for the diaphragm to be enhanced.

In accordance with the eighth aspect of the present invention, the bottomed cylindrical portion of the diaphragm cover integrally has the end wall portion. The cylindrical guide tube portion has one end connected to the outer periphery of the end wall portion in order to guide the outer periphery of an end part, on the end wall portion side, of the coil-shaped spring. The tapered tubular portion is formed in a tapered shape provided so as to be connected to the other end of the guide tube portion. The large diameter tubular portion has one end connected to the large diameter end of the tapered tubular portion and the other end connected to the collar portion. In this manner, it is possible to make the structure of the bottomed cylindrical portion simple, thus decreasing the number of machining steps when press-forming the diaphragm cover and reducing the machining cost. When the diaphragm cover is assembled to the body side, even if the diaphragm cover and the axis of the spring provided in a compressed state between the diaphragm and the end wall portion of the diaphragm cover are slightly displaced due to the spring being tilted, etc., since the spring is guided to the guide tube portion via the taper-shaped tapered tubular portion, it is possible to smoothly and reliably arrange the spring at the correct position where its axis matches up with the diaphragm cover.

In accordance with the ninth aspect of the present invention, the diaphragm is formed from the disk-shaped rubber sheet having a sheet thickness of at least its peripheral edge part uniform in the natural state. The cost can be reduced. Moreover, although the peripheral edge part of the diaphragm has a flat shape without a thick seal portion, since the clamping face holding the peripheral edge part of the diaphragm between itself and the collar portion of the diaphragm cover and the chamfered portion inclined further away from the collar portion in a radially outward direction and connected to the outer periphery of the clamping face so as to allow the peripheral edge end part of the diaphragm to run thereonto are formed on the body, and the diaphragm cover is fixed to the body radially outward of the chamfered portion, when a radially inward tensile load acts on the outer peripheral edge end part of the diaphragm, it is necessary for the peripheral edge part of the diaphragm to pass through between the collar portion and the clamping face via a radially inward portion where the gap is smaller than the chamfered portion and be compressed, thus improving the pull-out resistance load for the diaphragm.

In accordance with the tenth aspect of the present invention, the diaphragm is formed from the disk-shaped rubber sheet having a sheet thickness of at least its central part is uniform in the natural state. The cost can be reduced. Moreover, although the central part of the diaphragm has a flat shape without a thick seal portion, with regard to a gap between the first and second retainers in a state in which the seal member, the first retainer, the diaphragm central part and the second retainer are held between the step portion of the diaphragm rod and the nut screwed around the male thread cut in the shaft portion of the diaphragm rod, and the nut is screwed and tightened around the male thread, since the minimum gap portion is positioned further outward in the radial direction of the diaphragm than the maximum gap portion, it is possible to improve the sealing properties between the central part of the diaphragm and the first and second retainers due to the diaphragm being compressed by a relatively large load between the first and second retainers in the portion of the minimum gap portion. Moreover, when a radially outward tensile load acts on the diaphragm central part, in order for a portion of the diaphragm that is present further radially inward than the minimum gap portion to pass through between the first and second retainers via the minimum gap portion, it is necessary for it to be compressed, thus improving the pull-out resistance load for the diaphragm.

In accordance with the eleventh aspect of the present invention, the groove having a substantially V-shaped cross-section provided in at least one of the face of the first retainer on the diaphragm side and the face of the second retainer on the diaphragm side allows part of the diaphragm to sink into the groove, thereby enhancing the sealing properties and the pull-out resistance load for the diaphragm.

Furthermore, in accordance with the twelfth aspect of the present invention, since the central parts of the first and second retainers, which are made of metal, abut against each other directly or via the metal washer, even when the diaphragm deteriorates due to the influence of heat, etc. and the resilient force of the diaphragm is weakened, the gap between the first and second retainers does not change, and since the nut does not become loose, the connection of the diaphragm rod to the diaphragm central part is reliably maintained.

EXPLANATION OF REFERENCE NUMERALS AND SYMBOLS

Figure 1:
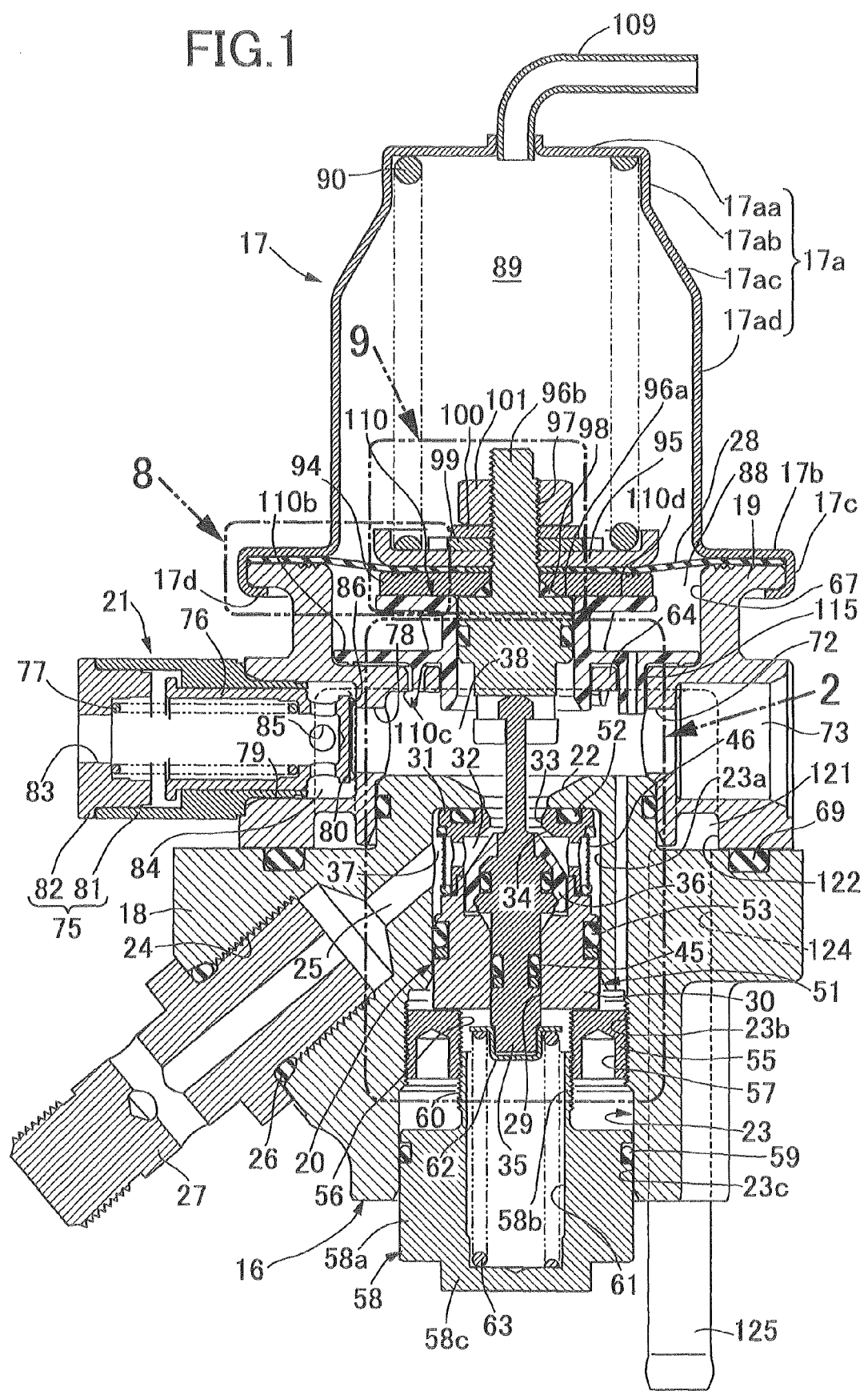
FIG. 1 is a vertical sectional view of a pressure-reducing valve for gas use (first embodiment).

16 Body
17 Diaphragm cover
17a Bottomed cylindrical portion
17aa End wall portion
17ab Guide tube portion
17ac Tapered tubular portion
17ad Large diameter tubular portion
17b Collar portion
17c Positioning tubular portion
17d Engagement portion
19a Flange portion
20 Valve mechanism
28 Diaphragm
36 Valve body
88 Pressure action chamber
89 Spring chamber
90 Spring
91 Clamping face
92 Chamfered portion
93,104,105 Groove
94 First retainer
95 Second retainer
97 Male thread
96 Diaphragm rod
96a Step portion
96b Shaft portion
98 Seal member
101 Nut
107 Washer

BEST MODE FOR CARRYING OUT THE INVENTION

A mode for carrying out the present invention is explained below by reference to one embodiment of the present invention shown in the attached drawings.

Embodiment 1

FIG. 1 to FIG. 14 show one embodiment of the present invention.

Firstly, in FIG. 1, this pressure-reducing valve for gas use is for reducing the pressure of compressed natural gas, which is a gaseous fuel, and supplying it to an engine (not illustrated), and includes a body 16 formed by joining first and second body members 18 and 19 to each other, and a diaphragm cover 17 joined to the body 16, the body 16 housing a valve mechanism 20, and a relief valve 21 being disposed in the body 16.

The body 16 is formed by securing the first and second body members 18 and 19 in a vertically superimposed manner at a plurality of positions. A housing hole 23 is provided in a central part of the first body member 18, the housing hole 23 extending vertically while having at its upper end an inward collar 22 protruding radially inward, the housing hole 23 being formed by coaxially connecting, in sequence from the inward collar 22 side, a small-diameter hole 23a, a threaded hole 23b having a larger diameter than that of the small-diameter hole 23a, and a large diameter hole 23c having a larger diameter than that of the threaded hole 23b, the lower end of the large diameter hole 23c opening downward on a lower end face of the first body member 18.

An inlet side connection hole 24 is provided in a side face of a lower part of the first body member 18, the inlet side connection hole 24 being for introducing compressed natural gas before the pressure is reduced, and a high pressure passage 25 coaxially communicating with the inlet side connection hole 24 is provided in the first body member 18. Furthermore, a pipe coupling 27 is screwed into the inlet side connection hole 24 with an annular seal member 26 disposed between the pipe coupling 27 and the first body 18.

Figure 2:
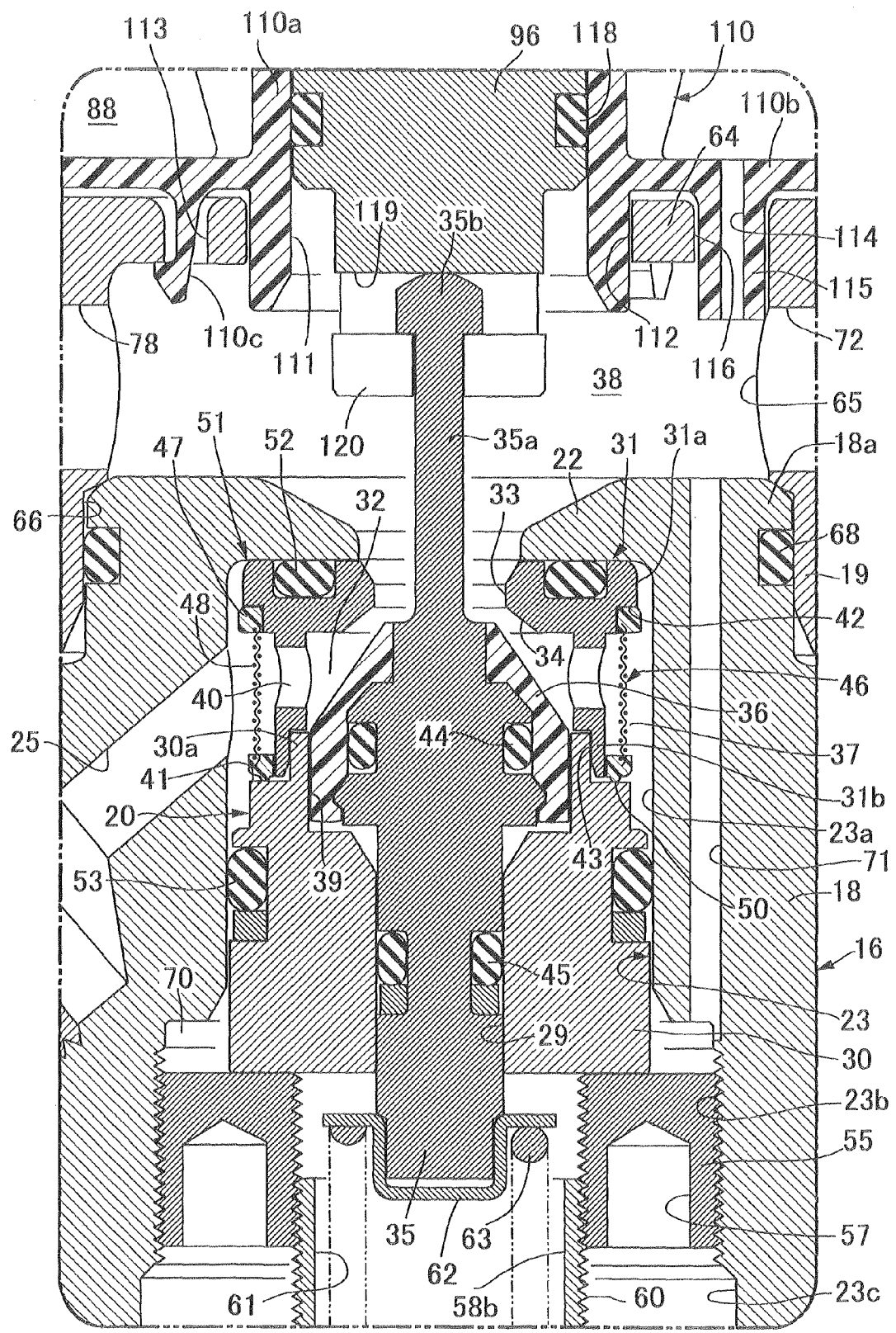
FIG. 2 is an enlarged view of a portion denoted by arrow 2 in FIG. 1 (first embodiment).

In FIG. 2, the valve mechanism 20 is driven by means of a diaphragm 28, and includes a valve guide member 30 having a guide hole 29, a valve seat member 31 joined to the valve guide member 30 so as to form a valve chamber 32 between itself and the valve guide member 30 and having provided thereon a valve seat 34 that faces the valve chamber 32 and has opening in its central part a valve hole 33 coaxial with the guide hole 29, a valve shaft 35 slidably fitted into the guide hole 29 while running loosely through the valve hole 33, and a valve body 36 fixedly provided on the valve shaft 35 within the valve chamber 32 so that it can be seated on the valve seat 34; the valve mechanism 20 is mounted on the first body member 18 of the body 16 so as to be disposed between a high pressure chamber 37 communicating with the valve chamber 32 and a pressure-reducing chamber 38 communicating with the valve hole 33.

The valve guide member 30 is made of metal in a thick cylindrical shape so as to form the guide hole 29, a cylindrical portion 30a is projectingly provided integrally with an end part of the valve guide member 30 on the valve seat member 31 side, the cylindrical portion 30a forming an insertion hole 39 coaxially communicating with the guide hole 29 so as to allow part of the valve body 36 to be inserted thereinto, and an annular clamping face 41 facing the valve seat member 31 side is formed on the end part of the valve guide member 30 on the valve seat member 31 side around the cylindrical portion 30a.

The valve seat member 31 is made of metal while integrally having a ring portion 31a having the valve hole 33 provided in its central part, and a cylindrical portion 31b, formed so as to have a smaller diameter than that of the ring portion 31a, having one end connected coaxially to the ring portion 31a and having a plurality of through holes 40 provided therein; a clamping face 42 coaxially facing the clamping face 41 of the valve guide member 30 is formed on an outer peripheral part of the ring portion 31a so as to coaxially surround one end of the cylindrical portion 31b. Furthermore, an end part of the cylindrical portion 31b on the valve guide member 30 side is provided with a press-fit recess 43 for allowing the cylindrical portion 30a of the valve guide member 30 to be press-fitted thereinto. That is, the valve guide member 30 and the valve seat member 31 are joined to each other by press-fitting the cylindrical portion 30a of the valve guide member 30 into the press-fit recess 43 of the valve seat member 31.

The valve body 36 is mounted on the valve shaft 35 within the valve chamber 32, and an annular seal member 44 that is in resilient contact with the inner periphery of the valve body 36 is mounted on the outer periphery of the valve shaft 35. Furthermore, an annular seal member 45 that is in sliding contact with the inner periphery of the guide hole 29 is mounted on the outer periphery of a portion of the valve shaft 35 that is slidably fitted into the guide hole 29.

A filter 46 disposed between the high pressure chamber 37 and the valve chamber 32 is mounted and supported on the valve guide member 30 and the valve seat member 31; this filter 46 is formed in a cylindrical shape so that opposite ends thereof abut against the annular clamping faces 41 and 42 formed on the valve guide member 30 and the valve seat member 31 respectively and facing each other in a direction along the axes of the guide hole 29 and the valve hole 33, and is clamped between the two clamping faces 41 and 42.

Figure 3:
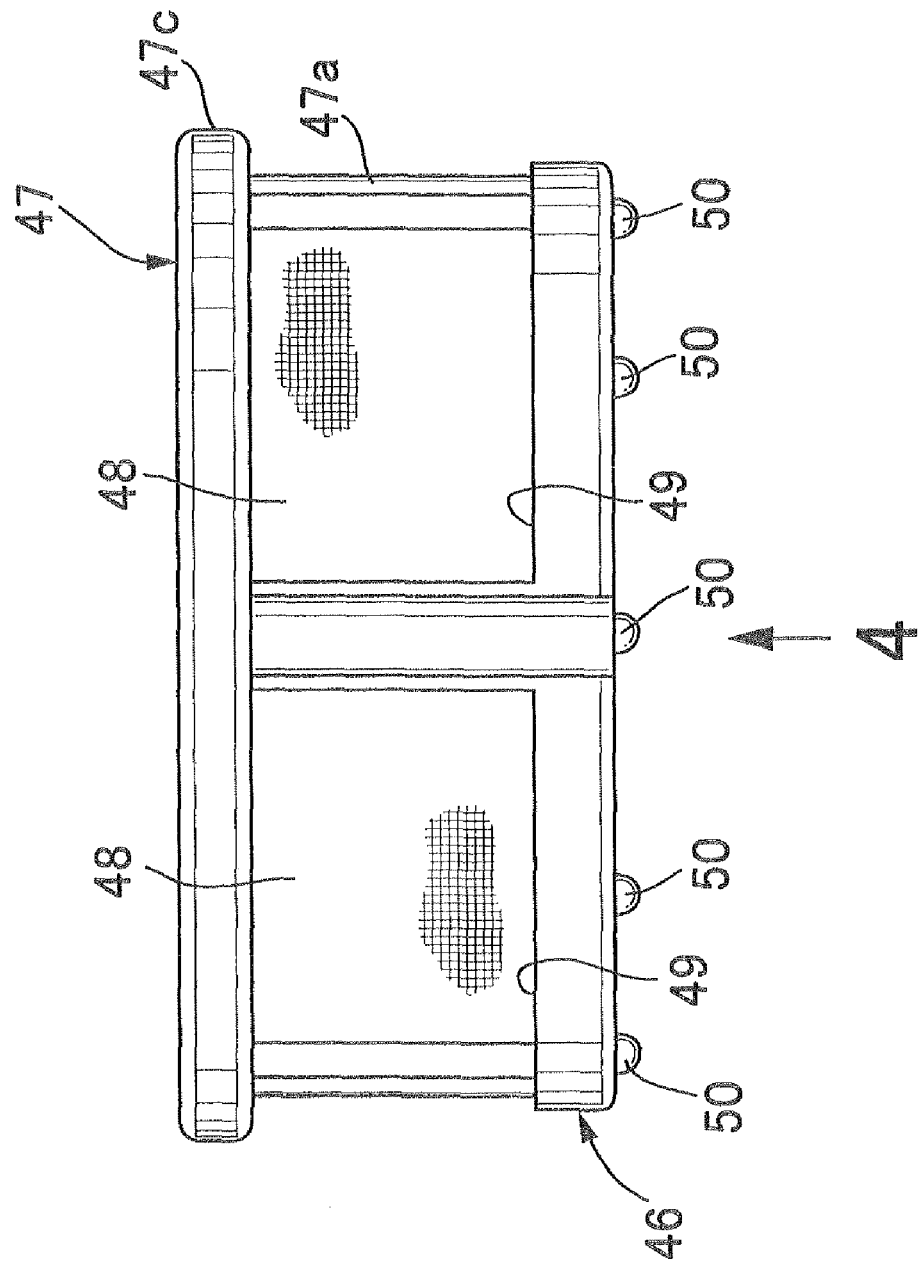
FIG. 3 is a side view of a filter (first embodiment).
Figure 4:
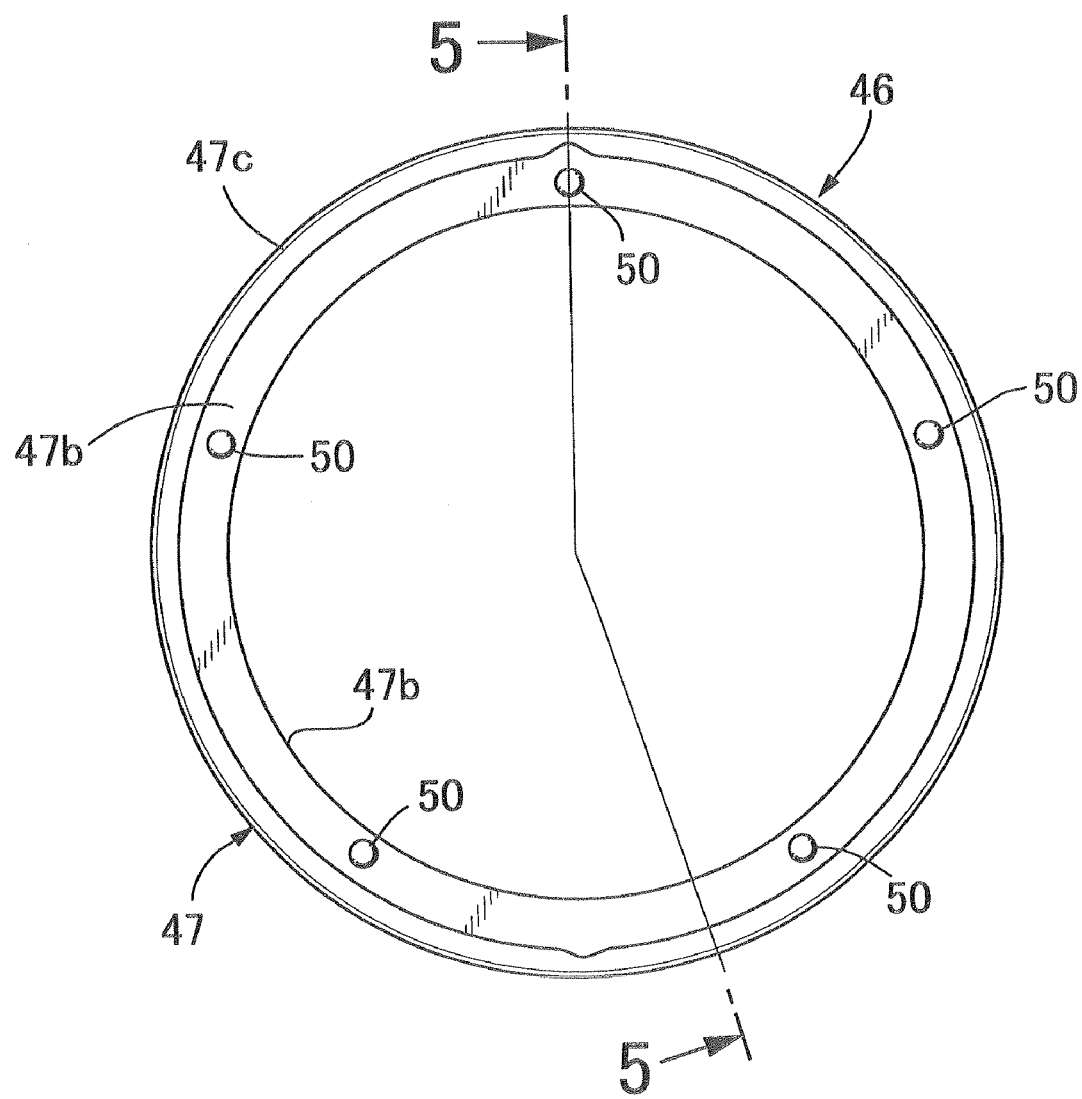
FIG. 4 is a view from arrow 4 in FIG. 3 (first embodiment).
Figure 5:
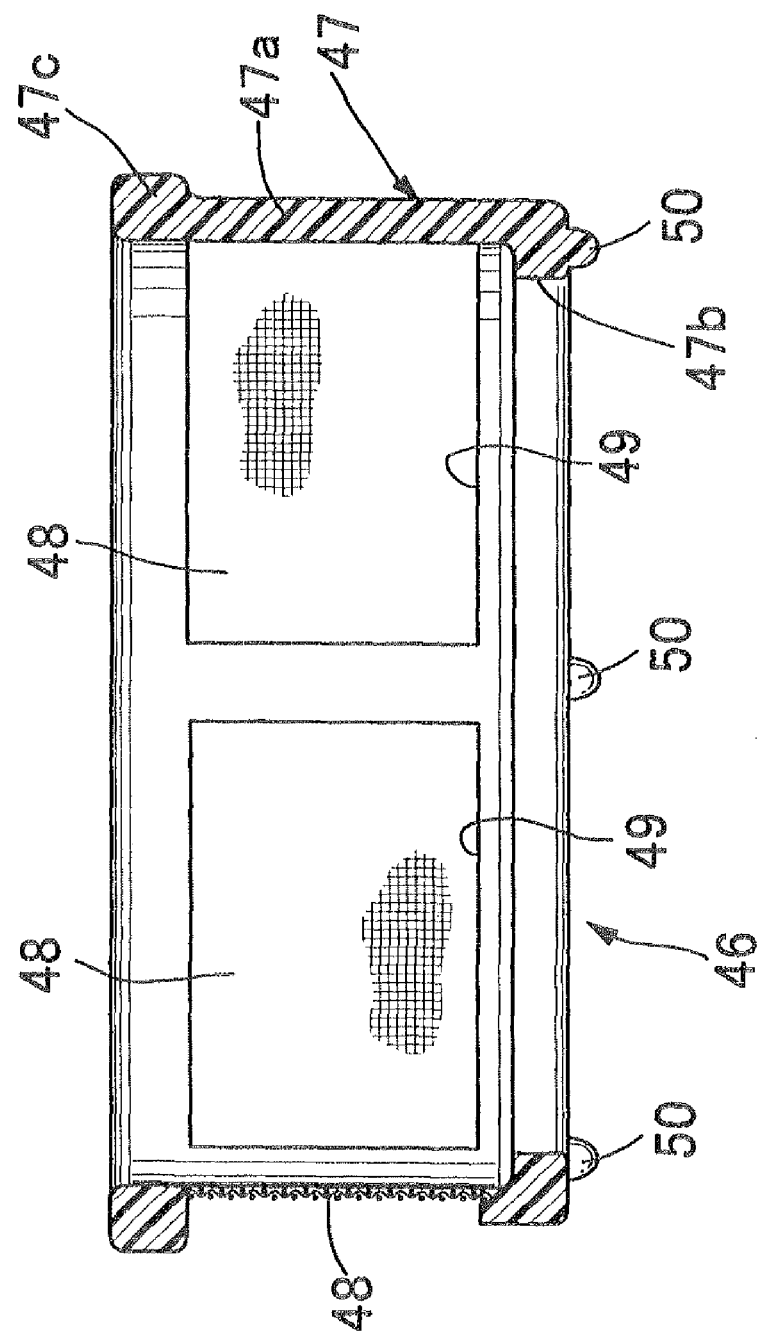
FIG. 5 is a sectional view along line 5-5 in FIG. 4 (first embodiment).

Referring to FIG. 3 to FIG. 5 together, the filter 46 is formed in a cylindrical shape so as to surround parts of the valve guide member 30 and the valve seat member 31 and is formed by providing filter elements 48 on a synthetic resin filter frame 47 provided with a plurality of, for example four, passage windows 49, the filter elements 48 covering the passage windows 49.

The filter frame 47 is formed from a synthetic resin so as to integrally have a cylindrical portion 47a in which the passage windows 49 are provided at equal intervals from each other, an inward collar portion 47b protruding radially inward from one end of the cylindrical portion 47a, and outward collar portion 47c protruding radially outward from the other end of the cylindrical portion 47a.

The outer periphery of the cylindrical portion 30a of the valve guide member 30 or the outer periphery of the cylindrical portion 31b of the valve seat member 31 is lightly press-fitted into the inner periphery at the one end in the axial direction of the filter frame 47, that is, the inner periphery at the one end in the axial direction of the cylindrical portion 47a, and in this embodiment the outer periphery of the cylindrical portion 31a of the valve seat member 31 is lightly press-fitted into the inner periphery at the lower end of the cylindrical portion 47a, and the opposite ends of the cylindrical portion 47a of the filter frame 47 are pressed against the two clamping faces 41 and 42.

Furthermore, projections 50 are projectingly provided integrally with the one end in the axial direction of the filter frame 47, the projections 50 abutting, among the two clamping faces 41 and 42, against the clamping face 41 provided on the valve guide member 30 when clamping the filter frame 47 between the two clamping faces 41 and 42 and being flattened, and in this embodiment, the projections 50 abutting against the clamping face 41 and being flattened are projectingly provided at a plurality of, for example five, positions equally spaced in the peripheral direction at the one end of the filter frame 47. Due to the resilient force of the projections 50 when flattened, the filter frame 47 is urged toward the other side in the axial direction, and the other end of filter frame 47 in the axial direction is strongly pressed against and comes into intimate contact with, among the clamping faces 41 and 42 of the valve guide member 30 and the valve seat member 31, the clamping face 42 of the valve seat member 31 facing the other end of the filter frame 47 in the axial direction.

The filter elements 48 are made of a synthetic resin or metal; in this embodiment the filter elements 48 are formed from a synthetic resin, and the entire filter 46 is formed from a synthetic resin. Moreover, the filter elements 48 are provided on the filter frame 47 so that their outer faces are disposed at a position set back inward from the outer peripheral face of the filter frame 47, and in this embodiment the filter elements 48 are provided on the filter frame 47 so that the outer peripheral faces of the filter elements 48 are flush with the inner peripheral face of the filter frame 47.

The valve mechanism 20 having the valve body 36, the valve shaft 35, the valve guide member 30, and the valve seat member 31, and the filter 46 mounted and supported on the valve guide member 30 and the valve seat member 31 form, by pre-assembling the filter 46 on the valve mechanism 20, a valve mechanism unit 51, and this valve mechanism unit 51 is mounted on the first body member 18 of the body 16.

The valve mechanism unit 51 is inserted from the valve seat member 31 side into the small-diameter hole 23 of the housing hole 23 provided in the first body member 18, and is mounted on the first body member 18 of the body 16, and the outer diameter of an end part of the filter frame 47 on the valve seat member 31 side, that is, the outward collar portion 47c, is set so as to be larger than the outer diameter of the valve seat member 31.

The valve mechanism unit 51 is inserted into the small-diameter hole 23a of the housing hole 23 so that an annular seal member 52 mounted on a face of the valve seat member 31 facing the inward collar 22 and coaxially surrounding the valve hole 33 is in resilient contact with the inward collar 22, and an annular seal member 53 that is in resilient contact with the inner periphery of the small-diameter hole 23a is mounted on the outer periphery of the valve guide member 30. In a state in which the valve mechanism unit 51 is inserted into the small-diameter hole 23a, as shown in FIG. 1 and FIG. 2, the annular high pressure chamber 37 is formed between the inner periphery of the small-diameter hole 23a and the valve mechanism unit 51, and the high pressure chamber 37 communicates with the high pressure passage 25.

Referring again to FIG. 1, a ring-shaped retaining member 55 is screwed into the threaded hole 23b of the housing hole 23, the retaining member 55 abutting against the valve guide member 30 and clamping the valve guide member 30 and valve seat member 31 between itself and the inward collar 22. One end part of the valve shaft 35 in the valve mechanism unit 51 projects from the guide hole 29 of the valve guide member 30, and a threaded hole 56, which has a larger diameter than that of the valve shaft 35, is provided in the retaining member 55 coaxially with the valve shaft 35 so that the one end part of the valve shaft 35 is inserted thereinto. Moreover, a bottomed engagement hole 57 is provided in an end face of the retaining member 55 on a side opposite to the valve mechanism unit 51, the engagement hole 57 allowing a tool (not illustrated) for rotating the retaining member 55 in order for it to be screwed into the threaded hole 23b to be detachably engaged therewith.

An open end of the housing hole 23 is hermetically closed by an adjustment member 58. This adjustment member 58 integrally has a large diameter portion 58a fitted into the large diameter hole 23c with an annular seal member 59, which is in resilient contact with the inner face of the large diameter hole 23c of the housing hole 23, mounted on the outer periphery of the large diameter portion 58a, a small diameter portion 58b formed so as to have a smaller diameter than that of the large diameter portion 58a and coaxially and integrally connected to the large diameter portion 58a while a male thread 60, which is screwed into the threaded hole 56 of the retaining member 55, is cut into the outer periphery thereof, and a tool engagement portion 58c, which is formed in, for example, a hexagonal shape so as to allow a tool (not illustrated) to engage therewith, coaxially and projecting provided from one end of the large diameter portion 58a. By engaging a tool with the tool engagement portion 58c and rotating it in a state in which the male thread 60 is screwed into the threaded hole 56 of the retaining member 55 the adjustment member 58 can be moved forward and backward in a direction along an axis that is coaxial with the valve shaft 35 of the valve mechanism unit 51.

Furthermore, the adjustment member 58 is provided with a bottomed housing recess 61 opening on the valve shaft 35 side, the housing recess 61 being coaxial with the valve shaft 35, and a rear coil spring 63 is provided in a compressed state between the closed end of the housing recess 61 and a spring receiving member 62 mounted at one end of the valve shaft 35. Adjusting the forward and backward position of the adjustment member 58 along the axial direction by rotation of the adjustment member 58 enables a spring load of the rear coil spring 63 to be adjusted.

Figure 6:
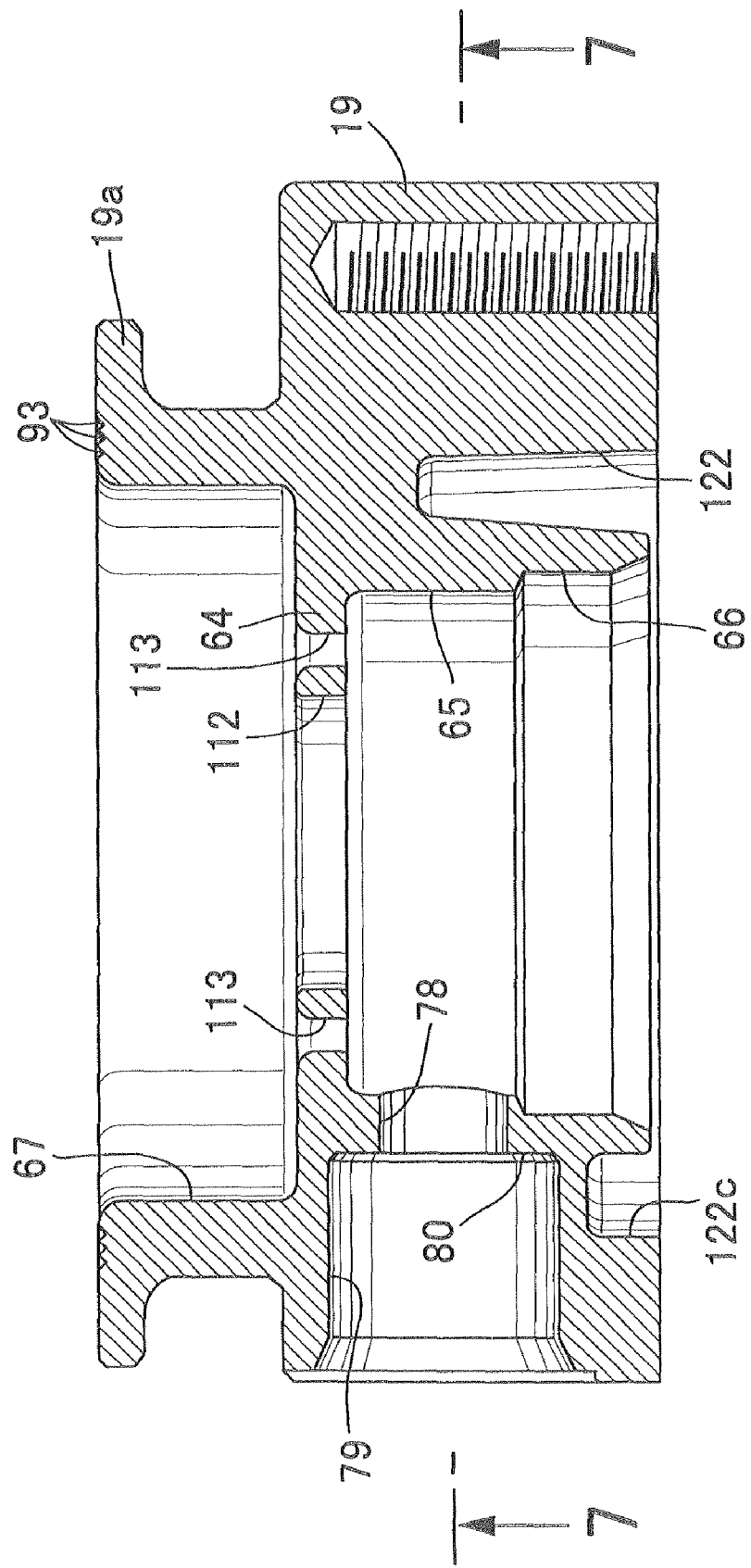
FIG. 6 is a vertical sectional view of a second body member and a sectional view along line 6-6 in FIG. 7 (first embodiment).
Figure 7:
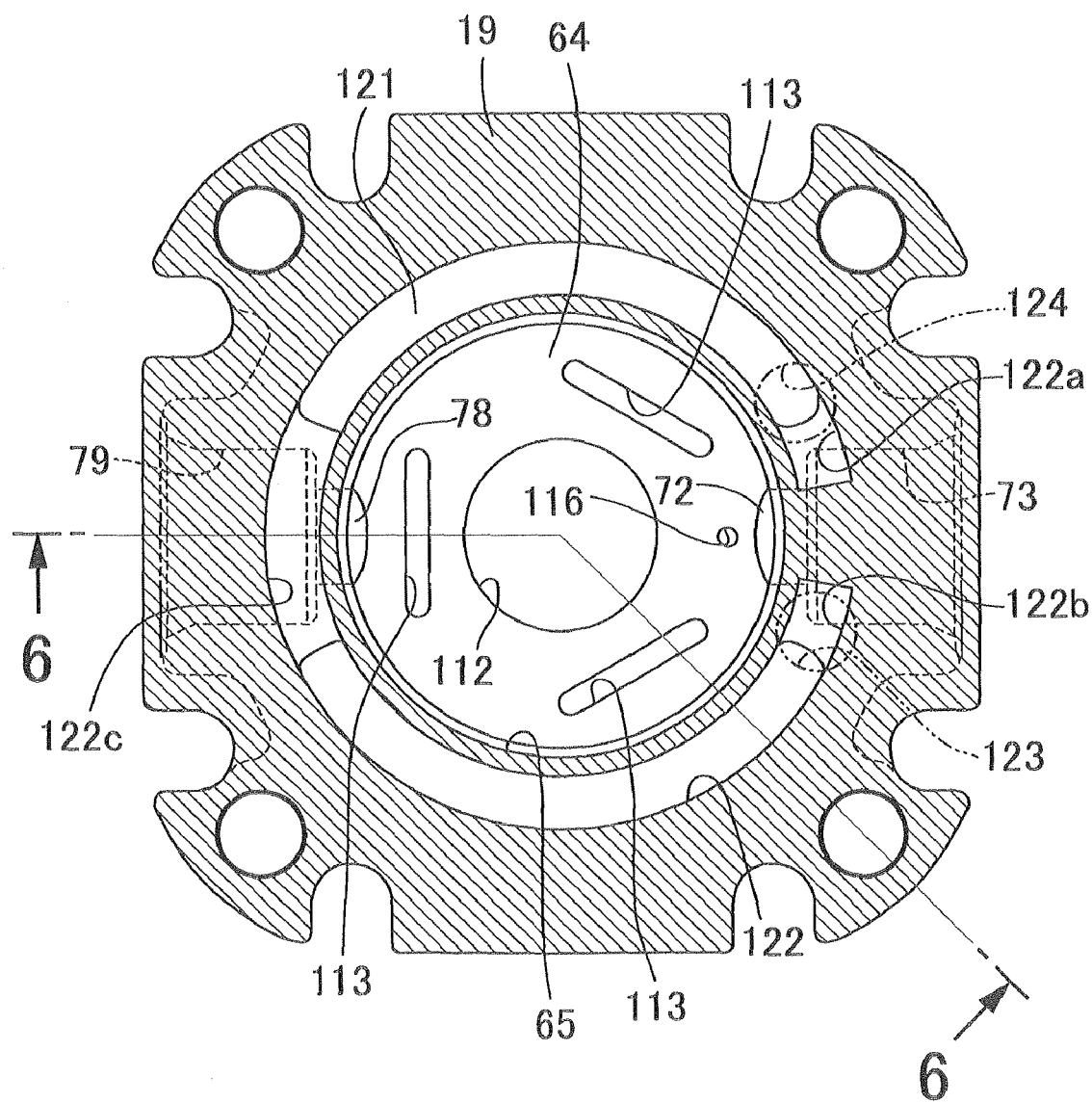
FIG. 7 is a sectional view along line 7-7 in FIG. 6 (first embodiment).

Referring to FIG. 6 and FIG. 7 together, a partition wall 64 positioned in a middle part, along the axis of the valve mechanism 20 disposed on the first body member 18 side, is provided on the second body member 19; a pressure-reducing chamber-forming hole 65 and a fitting hole 66 having a larger diameter than that of the pressure-reducing chamber-forming hole 65 are provided, in sequence from the partition wall 64 side so that they communicate with each other, in the second body member 19 on the first body member 18 side relative to the partition wall 64 coaxially with the housing hole 23 provided in the first body member 18, and a pressure action chamber-forming hole 67 is provided, coaxially with the pressure-reducing chamber-forming hole 65 and the fitting hole 66, in the second body member 19 on the side opposite to the first body member 18 relative to the partition wall 64.

A circular cross-section fitting projection 18a, which is coaxial with the housing hole 23, is projectingly provided integrally with the first body member 18 as shown in FIG. 2, and this fitting projection 18a is fitted into the fitting hole 66. An annular seal member 68, which is in resilient contact with the inner periphery of the fitting hole 66, is mounted on the outer periphery of the fitting projection 18a, and the fitting projection 18a is hermetically fitted into the fitting hole 66.

In a state in which the fitting projection 18a is fitted into the fitting hole 66, the first and second body members 18 and 19 are joined by a bolt (not illustrated) with an annular seal member 69 (see FIG. 1) present therebetween, the seal member 69 being mounted on the first body member 18 so as to surround the fitting projection 18a, and in a state in which the first and second body members 18 and 19 are joined, the pressure-reducing chamber 38 is formed between the extremity of the fitting projection 18a and the partition wall 64, the outer periphery of the pressure-reducing chamber 38 being defined by the pressure-reducing chamber-forming hole 65, and the pressure-reducing chamber 38 communicating with the valve hole 33 of the valve mechanism 20.

A back pressure chamber 70 is formed within the housing hole 23, whose open end is hermetically closed by the adjustment member 58, one end side of the valve shaft 35 of the valve mechanism 20 facing the back pressure chamber 70; this back pressure chamber 70 is hermetically separated from the annular high pressure chamber 37 formed between the valve guide member 30 and valve seat member 31 and the first body member 18 within the small-diameter hole 23a as a result of the seal member 53 mounted on the outer periphery of the valve guide member 30 being in resilient contact with the inner face of the small-diameter hole 23a of the housing hole 23 and the seal member 45 mounted on the outer periphery of the valve shaft 35 being in resilient contact with the inner periphery of the guide hole 29. Moreover, a small-diameter communication passage 71 providing communication between the pressure-reducing chamber 38 and the back pressure chamber 70 is provided in the first body member 18, and the back pressure chamber 70 communicates with the pressure-reducing chamber 38.

An outlet passage 72 having an inner end opening on an inner face of the pressure-reducing chamber-forming hole 65 is provided in the second body member 19 so that its axis is along the radial direction of the pressure-reducing chamber-forming hole 65. That is, the outlet passage 72 communicates with the pressure-reducing chamber 38, and an exit side connection tube (not illustrated) for guiding out compressed natural gas whose pressure has been reduced is hermetically connected by press-fitting, etc. to an exit side connection hole 73 provided in the second body member 19 so as to coaxially communicate with the outlet passage 72.

Referring to FIG. 1, the relief valve 21 opens in response to the pressure within the pressure-reducing chamber 38 becoming a preset pressure or above, and is formed from the second body member 19 of the body 16, a valve housing 75 fixed to the second body member 19, a valve body 76 guided by the valve housing 75, and a spring 77 provided in a compressed state between the valve housing 75 and the valve body 76.

A valve hole 78 and a mounting hole 79 are provided in the second body member 19 so as to be coaxial with each other, the valve hole 78 having its axis coaxial with the outlet passage 72 and communicating with the pressure-reducing chamber 38, the mounting hole 79 having at its inner end an annular valve seat 80 whose central part is faced by the valve hole 78 and having a larger diameter than that of the valve hole 78, and the outer end of the mounting hole 79 opening to the exterior.

The valve housing 75 is formed from a guide tube 81 formed in a stepped cylindrical shape with one end at a small diameter, and a cap 82 press-fitted into and fixed to the other end of the guide tube 81; one end part of the guide tube 81 is press-fitted into the mounting hole 79, and the cap 82 is provided with an externally opening hole 83.

The valve body 76 is slidably fitted into the one end of the guide tube 81 of the valve housing 75, and a valve chamber 84 is formed between the valve housing 75 and valve body 76 and the second body member 19. Moreover, the valve body 76 is formed in a bottomed cylindrical shape with a closed end on the valve hole 78 side, a plurality of through holes 85 communicating with the valve chamber 84 are provided in a side wall of the valve body 76, and the valve chamber 84 opens to the exterior via the through holes 85, the interior of the valve body 76, and the externally opening hole 83.

An annular seat portion 86, which is formed from, for example, rubber, is provided on an outer face of the closed end of the valve body 76 on the valve hole 78 side, and the spring 77, which exhibits a spring force in a direction that seats the seat portion 86 on the valve seat 80, is provided in a compressed state between the valve body 76 and the cap 82 of the valve housing 75.

The diaphragm 28 is formed from a disk-shaped rubber sheet for which the sheet thickness of at least a peripheral edge part and a central part is uniform in the natural state, and in this embodiment it is formed in a disk shape in which the entire diaphragm 28 has a uniform sheet thickness in the natural state. The peripheral edge part of the diaphragm 28 is clamped between the second body member 19 of the body 16 and the diaphragm cover 17 fixed to the second body member 19, a pressure action chamber 88 is formed between the second body member 19 and the diaphragm 28 so that one face of the diaphragm 28 faces the pressure action chamber 88, the outer periphery of the pressure action chamber 88 being defined by the pressure action chamber-forming hole 67 of the second body member 19, and a spring chamber 89 is formed between the diaphragm 28 and the diaphragm cover 17 so that the other face of the diaphragm 28 faces the spring chamber 89, a coil-shaped spring 90 housed in the spring chamber 89 being provided in a compressed state between the diaphragm cover 17 and the diaphragm 28.

The diaphragm cover 17 is formed by press-forming thin metal so as to integrally have a bottomed cylindrical portion 17a having an end wall portion 17aa at the end on the side opposite to the diaphragm 28, a collar portion 17b protruding radially outward from the open end of the bottomed cylindrical portion 17a, and a cylindrical positioning tubular portion 17c connected to the outer periphery of the collar portion 17b and extending to the body 16 side.

Figure 8:
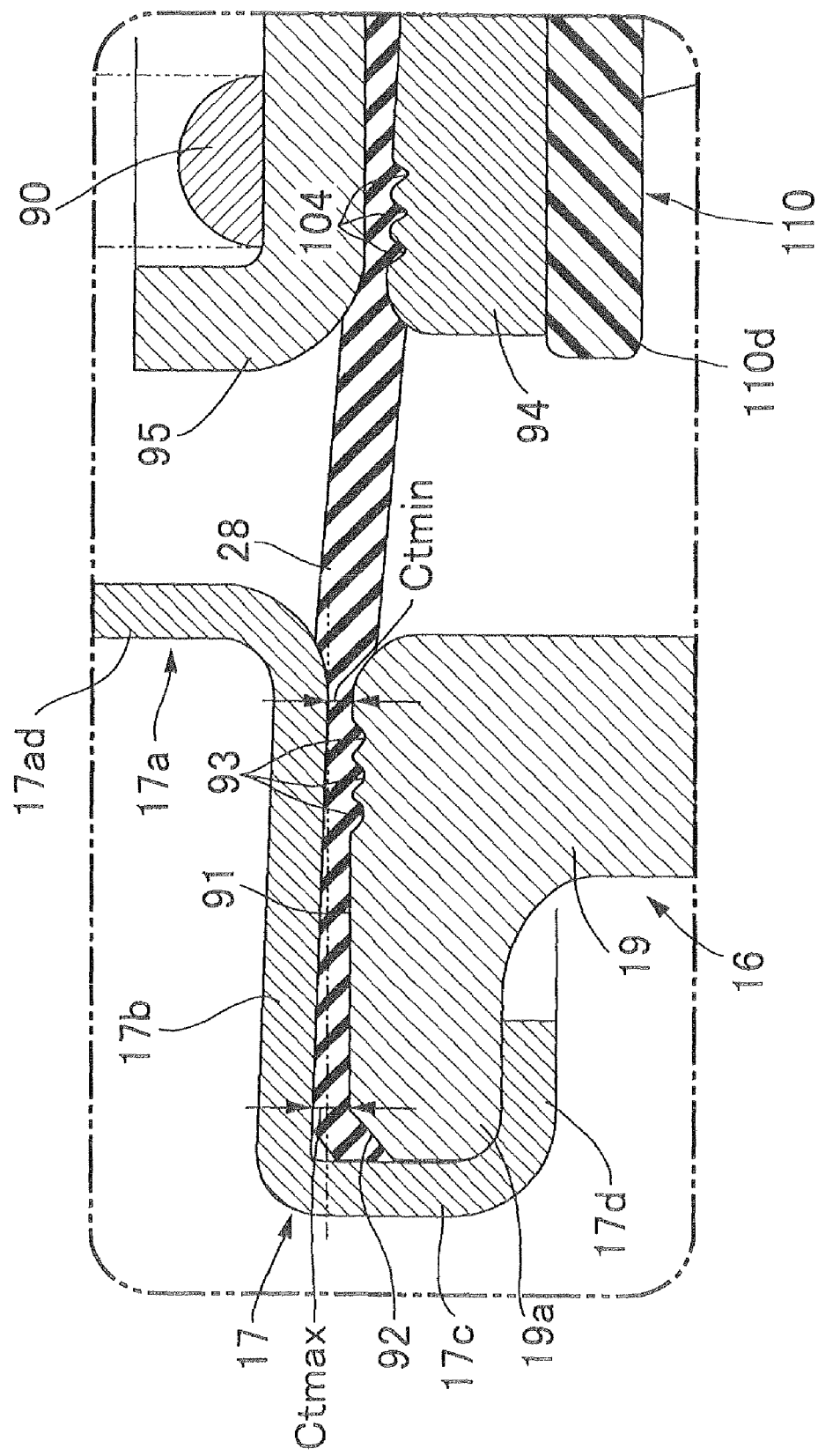
FIG. 8 is an enlarged view of a portion denoted by arrow 8 in FIG. 1 (first embodiment).

In FIG. 8, integrally provided with an end part of the second body member 19 of the body 16 on the diaphragm 28 side is a flange portion 19a protruding radially outward so as to form a clamping face 91 compressively holding the diaphragm 28 between itself and the collar portion 17b of the diaphragm cover 17, and formed on an outer peripheral part of the flange portion 19a is a tapered chamfered portion 92 connected to the outer periphery of the clamping face 91 and inclined so as to become further away from the collar portion 17b of the diaphragm cover 17 in going radially outward so that the peripheral edge end part of the diaphragm 28 runs onto it.

The positioning tubular portion 17c of the diaphragm cover 17 abuts against the outer periphery of the flange portion 19a in order to carry out positioning of the diaphragm cover 17 relative to the body 16, and a tip portion of this positioning tubular portion 17c is swaged radially inward so as to form an engagement portion 17d that engages with the flange portion 19a. That is, the positioning tubular portion 17c of the diaphragm cover 17 is fixed to the second body member 19 of the body 16 so that the peripheral edge part of the diaphragm 28 is compressively held between the collar portion 17b and the clamping face 91 of the body 16.

In a state in which the diaphragm cover 17 is fixed to the second body member 19 of the body 16, the gap between the collar portion 17b of the diaphragm cover 17 and the clamping face 91 is set so that it increases in going radially outward. That is, of the gap between the collar portion 17b and the clamping face 91a portion on the radially inner end side is a minimum gap Ctmin, and a portion on the radially outer end side is a maximum gap Ctmax so that the minimum gap portion Ctmin is positioned further inward in the radial direction of the diaphragm 17 than the maximum gap portion Ctmax.

The clamping face 91 is formed flat along a plane perpendicular to the axis of the bottomed cylindrical portion 17a of the diaphragm cover 17 in a state in which the diaphragm cover 17 is fixed to the flange portion 19a of the second body member 19 of the body 16, and in order that, of the gap between the collar portion 17b of the diaphragm cover 17 and the clamping face 91, the portion with the minimum gap Ctmin is positioned further inward in the radial direction of the diaphragm 17 than the portion with the maximum gap Ctmax, the collar portion 17b is formed so as to be inclined so that it becomes further away from the clamping face 91 in going radially outward.

Moreover, the diaphragm cover 19 is fixed to the body 16 by swaging the tip portion of the positioning tubular portion 17c connected to the outer periphery of the collar portion 17b of the diaphragm cover 17 and engaging it with the flange portion 19a, and the diaphragm cover 17 is fixed to the body 16 further radially outward than the portion with the minimum gap Ctmin so that the collar portion 17b can resiliently deform to thus exhibit a resilient force for pressing the diaphragm 28 against the clamping face 91 side.

Furthermore, grooves 93 having a substantially V-shaped cross-section in, for example, the form of three concentric circles are formed in at least one of the clamping face 91 and a face of the collar portion 17b on the clamping face 91 side, in this embodiment the clamping face 91, so that part of the diaphragm 28 sinks thereinto, and in this embodiment the grooves 93 are disposed on the portion having, of the gap between the collar portion 17b of the diaphragm cover 17 and the clamping face 91, the minimum gap Ctmin.

Figure 9:
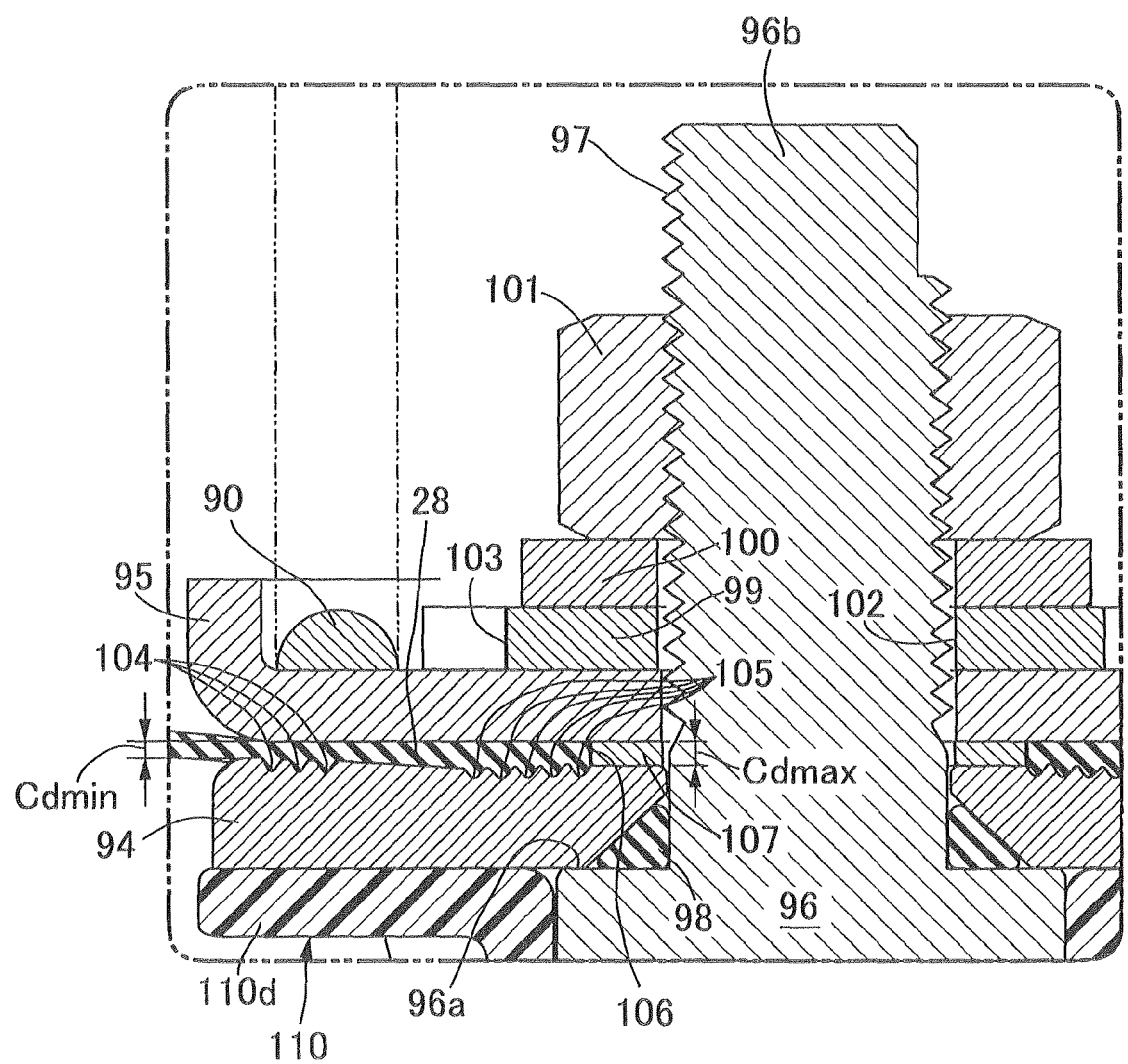
FIG. 9 is an enlarged view of a portion denoted by arrow 9 in FIG. 1 (first embodiment).

Referring in addition to FIG. 9, a ring-shaped first retainer 94 abuts against a central part of a face of the diaphragm 28 facing the pressure action chamber 88, and a ring-shaped second retainer 95 abuts against a central part of a face of the diaphragm 28 facing the spring chamber 89, the central part of the diaphragm 28 being held between the first retainer 94 and the second retainer 95.

A diaphragm rod 96 having one end connected to the valve body 36 of the valve mechanism 20 has the other end connected to the central part of the diaphragm 28, the other end of this diaphragm rod 96 is coaxially and integrally provided with a shaft portion 96b so as to form an annular step portion 96a facing the diaphragm 28 side on the pressure action chamber 88 side, and a male thread 97 is cut into the outer periphery of the shaft portion 93b. The shaft portion 96b is passed through central parts of the first retainer 94, the diaphragm 28, and the second retainer 95, and an annular seal member 98 is disposed between the first retainer 94 and the step portion 96a.

A nut 101 is screwed around the male thread 97 so as to hold a ring-shaped retainer co-rotation preventing member 99 abutting against the second retainer 95 and a washer 100 abutting against the retainer co-rotation preventing member 99 between the nut 101 and the second retainer 95, and the other end of the diaphragm rod 96 is connected and fixed to the central part of the diaphragm 28 by tightening the nut 101.

Figure 10:
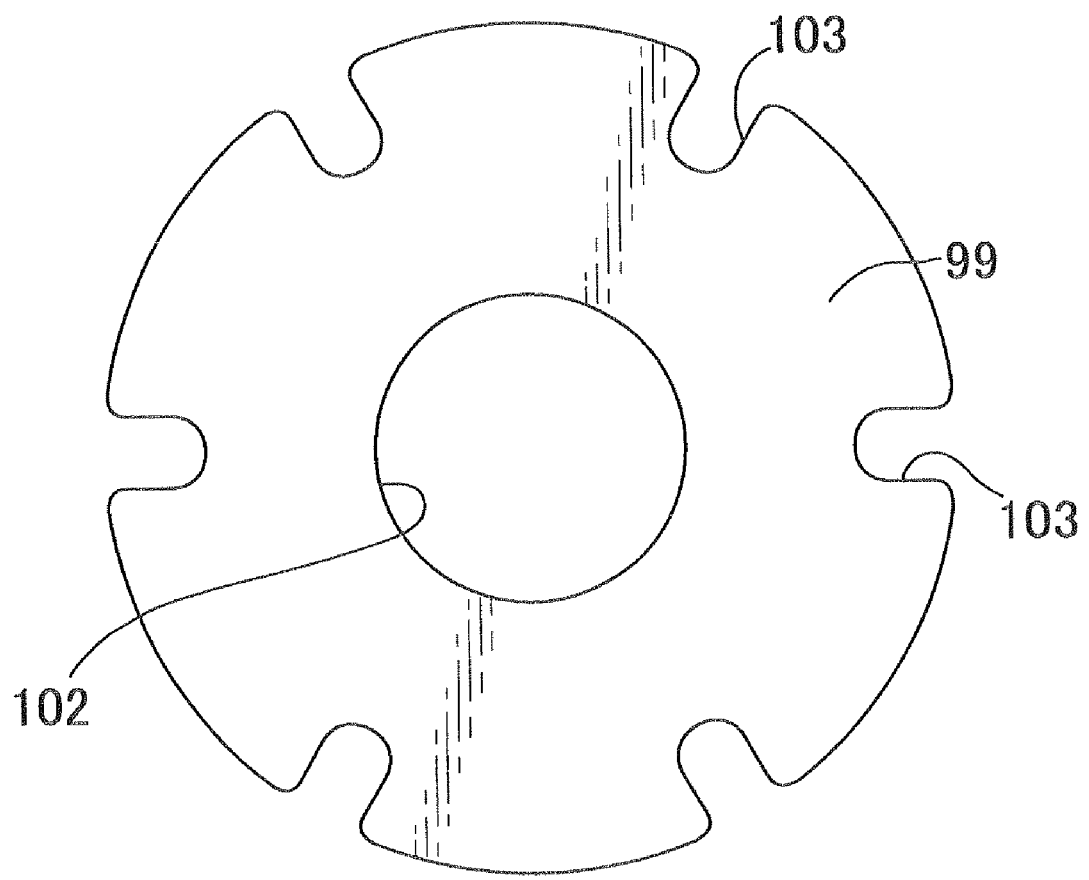
FIG. 10 is a plan view of a retainer co-rotation preventing member (first embodiment).
Figure 11:
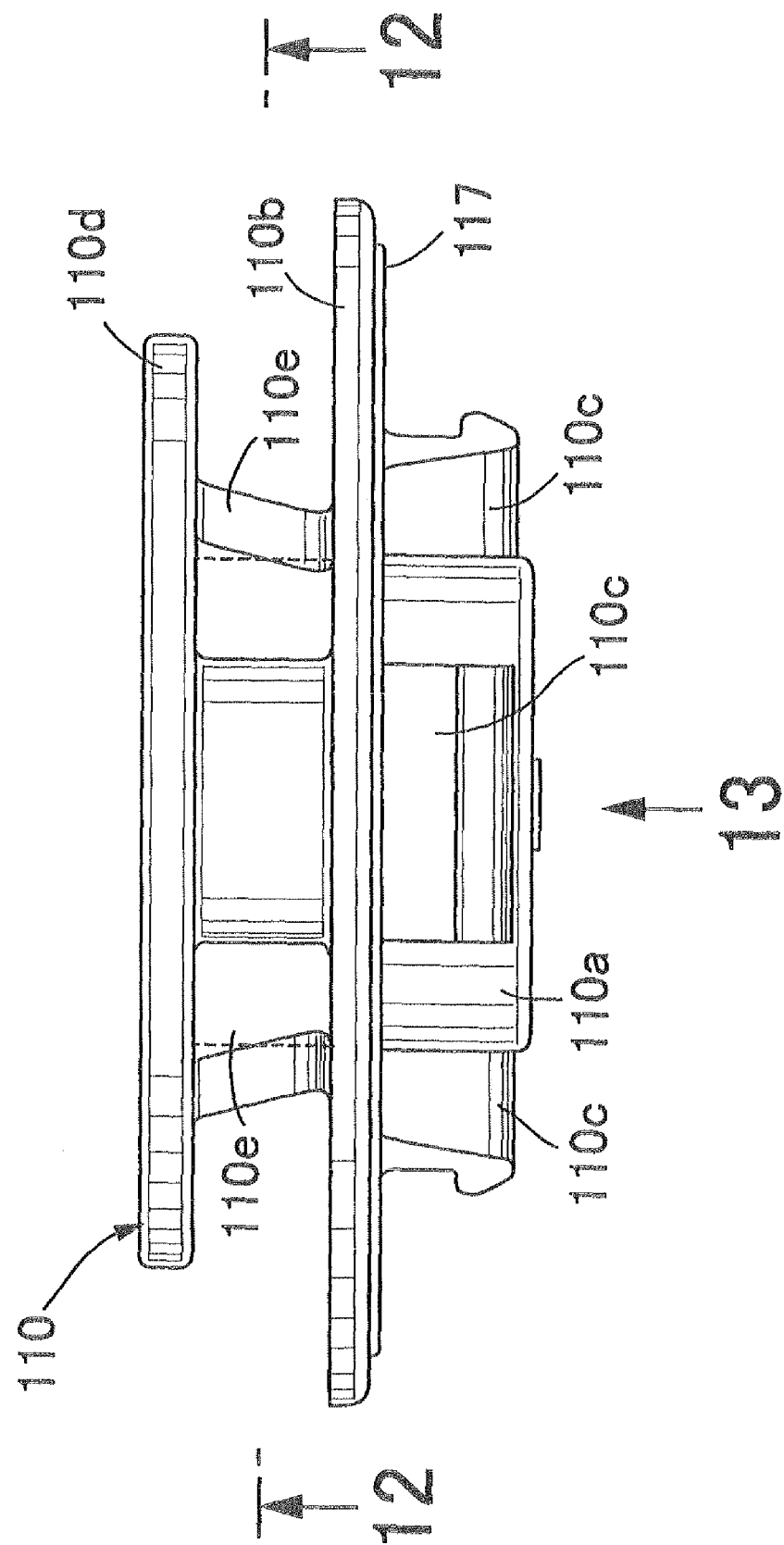
FIG. 11 is a side view of a guide member (first embodiment).
Figure 12:
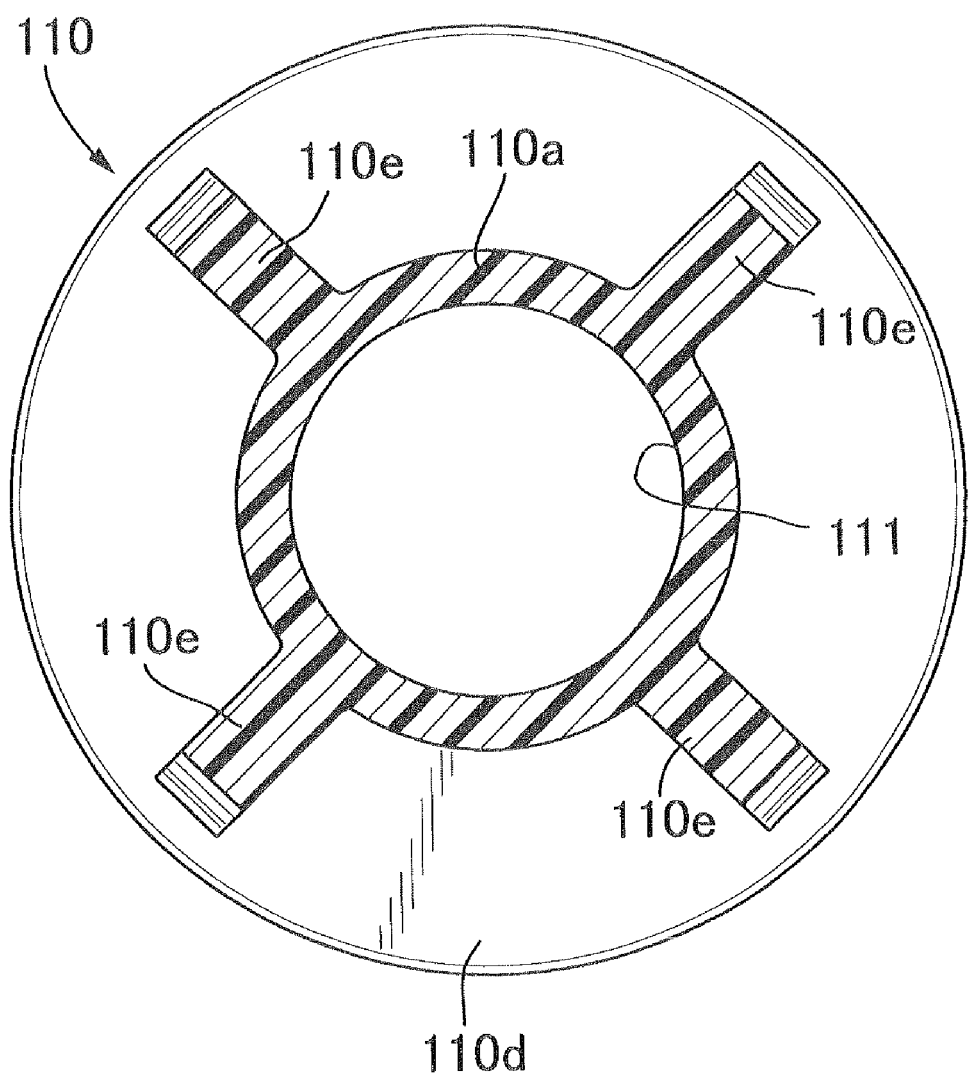
FIG. 12 is a sectional view along line 12-12 in FIG. 11 (first embodiment).
Figure 13:
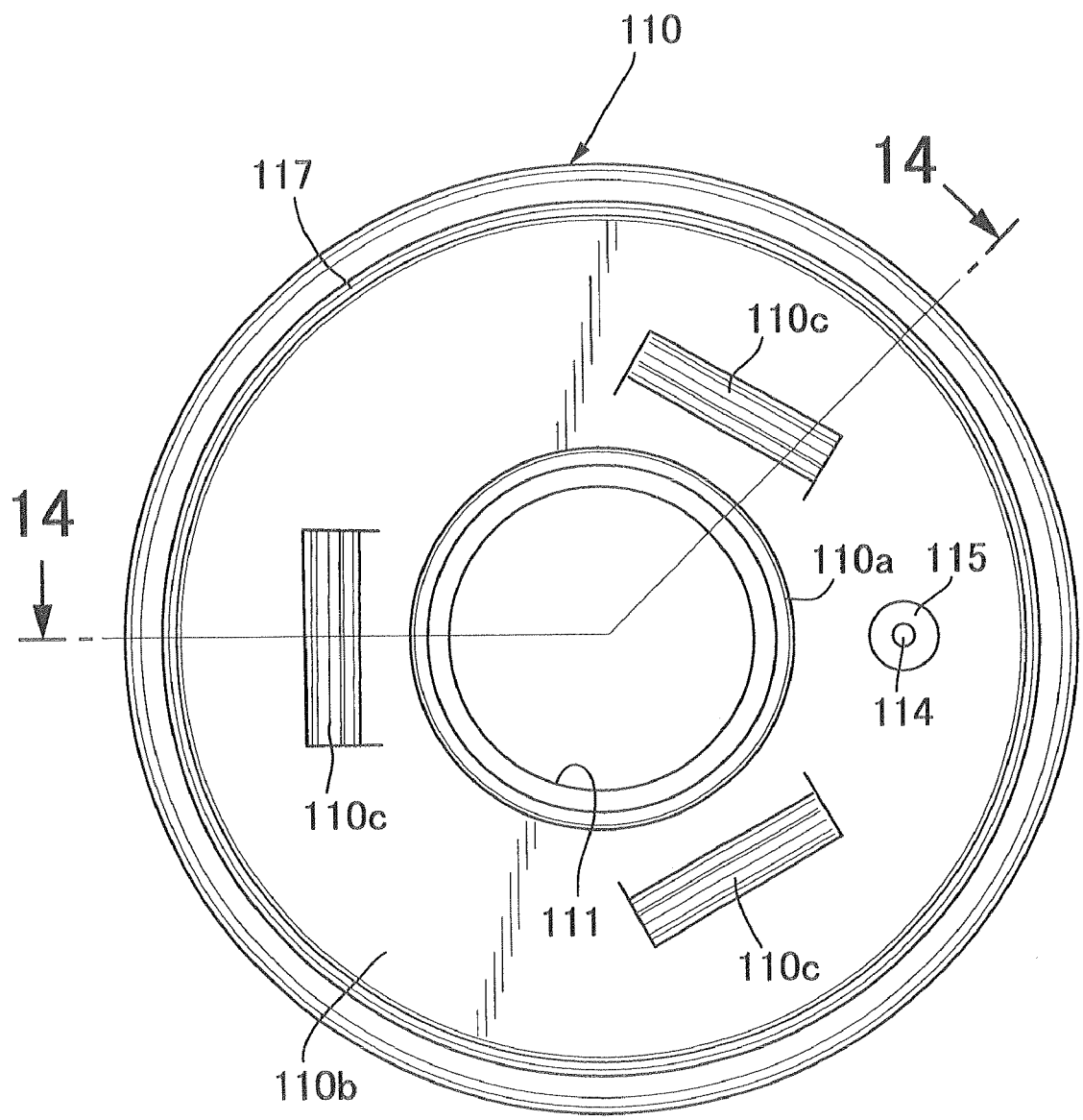
FIG. 13 is a view from arrow 13 in FIG. 11 (first embodiment).
Figure 14:
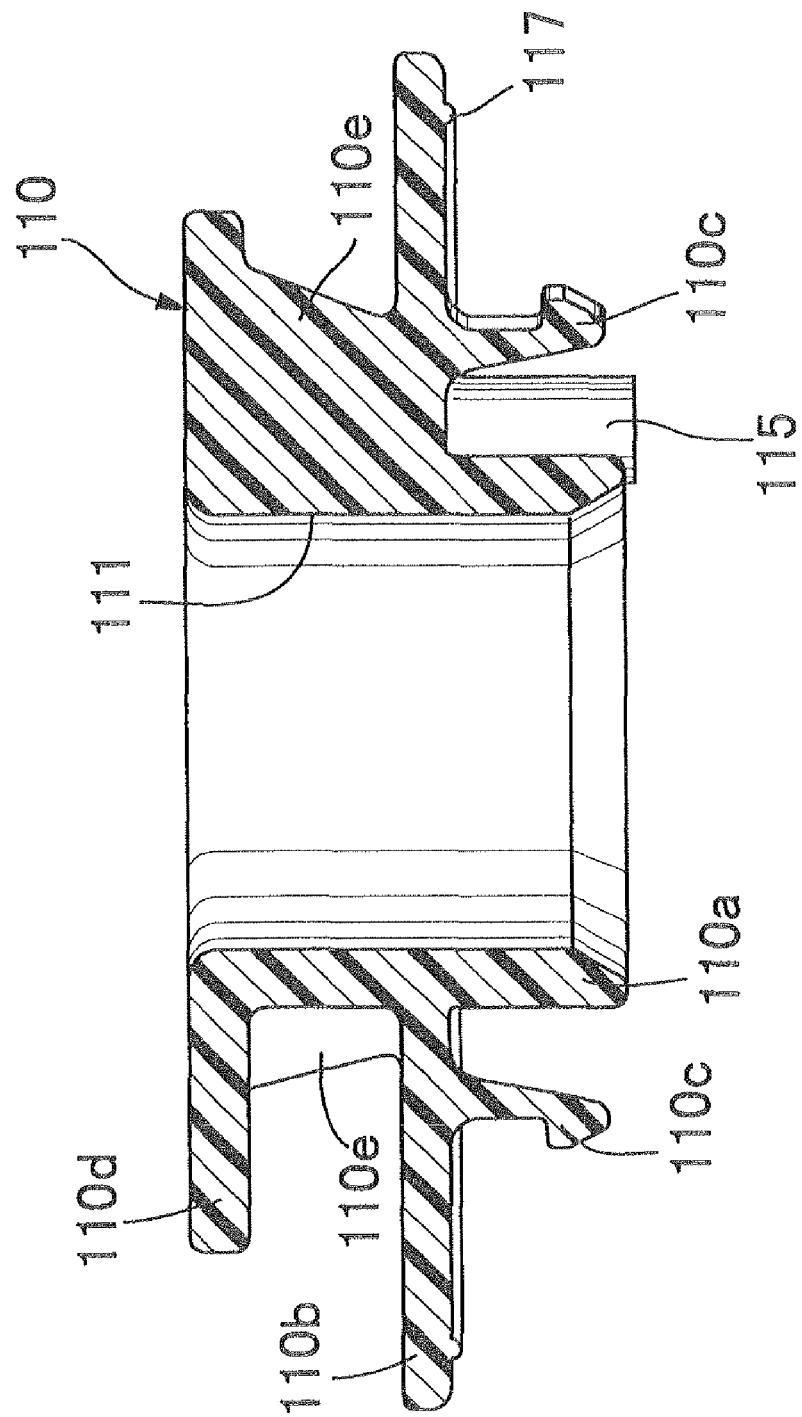
FIG. 14 is a sectional view along line 14-14 in FIG. 13 (first embodiment).

In FIG. 10, the retainer co-rotation preventing member 99 is formed in a ring shape having a larger diameter than that of the washer 100 and has in its central part a through hole 102 through which the shaft portion 96b of the diaphragm rod 96 is passed, and a plurality of engagement recesses 103 are provided on the outer periphery of the retainer co-rotation preventing member 99, a jig (not illustrated) engaging with the engagement recesses 103 when tightening the nut 101 screwed around the male thread 97 with the retainer co-rotation preventing member 99 and the washer 100 held between the nut 101 and the second retainer 94; in a state in which the jig is engaged with these engagement recesses 103, even if the nut 101 is rotated, rotation of the retainer co-rotation preventing member 99 is prevented, thereby preventing rotation of the second retainer 95.

A gap between the first and second retainers 94 and 95 in a state in which the nut 101 is screwed and tightened around the male thread 97 is set so that it decreases in going radially outward. That is, the gap between the first and second retainers 94 and 95 in a state in which the central part of the diaphragm 28 is held therebetween by screwing the nut 101 around the male thread 97 is set so that the portion on the radially outer end side is a minimum gap Cdmin and the portion on the radially inner end side is a maximum gap Cdmax. Thus, the minimum gap portion Cdmin is positioned further outward in the radial direction of the diaphragm 17 than the maximum gap portion Cdmax.

Due to such setting of the gap between the first and second retainers 94 and 95, the face of the first retainer 94 facing the diaphragm 28 is formed so that it is inclined toward the second retainer 95 in going radially outward.

Moreover, grooves 104 and 105 with a substantially V-shaped cross-section are formed in at least one of a face of the first retainer 94 on the diaphragm 28 side and a face of the second retainer 95 on the diaphragm 28 side, in this embodiment the face of the first retainer 94 on the diaphragm 28 side, so that part of the diaphragm 28 sinks thereinto. The grooves 104 are formed in the first retainer 94 in, for example, the form of four concentric circles in the portion having, of the gap between the first and second retainers 94 and 95, the minimum gap Cdmin, and the grooves 105 are formed in the first retainer 94 in, for example, the form of five concentric circles in the portion having, of the gap between the first and second retainers 94 and 95, the maximum gap Cdmax.

Furthermore, central parts of the first and second retainers 94 and 95, which are made of metal, are abutted against each other via a metal washer 107 disposed in a central hole 106 provided in the central part of the diaphragm 28. The central parts of the first and second retainers 94 and 95 may be abutted directly against each other while omitting the washer 107.

The coil spring 90 is provided in a compressed state between the second retainer 95 and the end wall portion 17aa, which is a closed end of the bottomed cylindrical portion 17a of the diaphragm cover 17, and the spring load of the coil spring 90 acts on the valve shaft 35 and the valve body 36 of the valve mechanism 20 in a valve-opening direction, but the spring load of the rear coil spring 63 provided in a compressed state between the valve shaft 35 and the adjustment member 58 acts on the valve body 36 in a valve-closing direction, and by adjusting the spring load of the rear coil spring 63 the spring load of the coil spring 90 is also adjusted in practice.

Furthermore, a negative pressure inlet tube 109 communicating with the spring chamber 89 is connected to the end wall portion 17aa of the bottomed cylindrical portion 17a of the diaphragm cover 17 by, for example, press-fitting or brazing; this negative pressure inlet tube 109 is connected to an engine, and engine intake negative pressure is introduced into the spring chamber 89.

The diaphragm rod 96 axially movably runs through a central part of the partition wall 64 of the second body member 19, and a synthetic resin guide member 110 for guiding axial movement of the diaphragm rod 96 is mounted on the partition wall 64.

In FIG. 11 to FIG. 14, the guide member 110 integrally has a cylindrically shaped guide portion 110a provided with a guide hole 111 for the diaphragm rod 96 to be slidably fitted into, an extended portion 110b extending radially outward from the guide portion 110a, and engagement portions 110c projecting from the extended portion 110b at positions spaced from the guide portion 110a, and the guide member 110 is mounted on the partition wall 64 by fitting one end of the guide portion 110a into a through hole 112 provided in a central part of the partition wall 64 of the second body member 19 and resiliently engaging the engagement portions 110c with the partition wall 64 of the body 16.

The extended portion 110b is formed in a collar shape while protruding radially outward from the entire outer periphery of an axially middle part of the guide portion 110a so as to oppose the partition wall 64 from the pressure action chamber 88 side, a face opposing the partition wall 64 being a flat face.

The engagement portions 110c are projectingly provided integrally with the extended portion 110b at a plurality of, for example three, positions equally spaced in the peripheral direction so as to surround the guide portion 110a, and the engagement portions 110c are inserted from one face side of the partition wall 64 into engagement holes 113 provided in the partition wall 64 while flexing and resiliently engaging with the other face of the partition wall 64. Moreover, each of the engagement portions 110c is formed so that the cross-section on a plane perpendicular to the axis of the guide portion 110a is a rectangle, and each of the engagement holes 113 is also formed in a rectangular shape.

An aspirator passage 114 providing communication between the pressure-reducing chamber 38 and the pressure action chamber 88 is formed in the guide member 110 so as to run through the partition wall 64, and this aspirator passage 114 is formed within an aspirator tube 115 having one end integrally connected to the extended portion 110b. An aspirator hole 116 is provided in the partition wall 64, the aspirator tube 115 being fitted into the aspirator hole 116, and the other end of the aspirator tube 115 projects into the pressure-reducing chamber 38 in a state in which the guide member 110 is mounted on the partition wall 64. Moreover, the aspirator passage 114 is formed at the same time as when die-molding the guide member 110.

A ring-shaped projection 117 is projectingly provided integrally with a face of the extended portion 110b opposing the partition wall 64, the ring-shaped projection 117 coaxially surrounding the guide portion 110a while being pressed against the partition wall 64 when the engagement portions 110c are resiliently engaged with the partition wall 64, and the engagement portions 110c and the aspirator tube 115 are disposed further inward than the projection 117.

A stopper portion 110d protruding radially outward from an end part of the guide portion 110a on the diaphragm 28 side is provided integrally with the guide member 110, the stopper portion 110d restricting displacement of the diaphragm 28 toward the side on which the capacity of the pressure action chamber 88 is decreased. Moreover, a plurality of, for example four, ribs 110e extending radially from the outer periphery of the guide portion 110a while providing a connection between the extended portion 110b and the stopper portion 110d are provided integrally with the guide member 110.

The diaphragm rod 96 is slidably fitted into the guide hole 111 of the guide member 110, and an annular seal member 118 that is in sliding contact with the inner periphery of the guide hole 111 is mounted on the outer periphery of the diaphragm rod 96. One end of the diaphragm rod 96 projects into the pressure-reducing chamber 38 from the guide hole 111, and the one end of the diaphragm rod 96 is connected to the other end of the valve shaft 35 of the valve mechanism 20 within the pressure-reducing chamber 38.

Referring to FIG. 2, an engagement groove 119 opening on a side face of the diaphragm rod 96 is provided on the one end of the diaphragm rod 96, the engagement groove 119 extending along a plane perpendicular to the axis of the diaphragm rod 96, and a slit 120 running between the engagement groove 119 and an end face of the diaphragm rod 96 on the valve mechanism 20 side is provided so as to open on a side face of the diaphragm rod 96 in the same direction as the engagement groove 119.

A small-diameter shaft portion 35a is coaxially provided on the valve shaft 35 on which is fixedly provided the valve body 36, the small-diameter shaft portion 35a running loosely through the valve hole 33 and being capable of being inserted through the slit 120, and the shaft portion 35a is inserted through the slit 120 so as to engage an enlarged-diameter engagement portion 35b provided at the tip of the small-diameter shaft portion 35a with the engagement groove 119, thus connecting the other end of the valve shaft 35 of the valve mechanism 20 to the one end part of the diaphragm rod 96. That is, the diaphragm rod 96 is connected to the valve body 36 via the valve shaft 35.

In such a pressure-reducing valve for gas use, when the diaphragm 28 flexes to the spring chamber 89 side against the spring force of the coil spring 90 due to a pressure of the pressure action chamber 88, the valve mechanism 20 closes, when the diaphragm 28 flexes to the pressure action chamber 88 side due to the pressure of the pressure action chamber 88 decreasing, the valve mechanism 20 opens, and by repeating such opening and closing of the valve mechanism 20, high pressure compressed natural gas is reduced in pressure and discharged via the exit side connection hole 73.

Referring again to FIG. 6 and FIG. 7, in a state in which the first and second body members 18 and 19 are joined, a heating medium passage 121 for allowing engine cooling water, which is a heating medium, to flow through is formed between the first and second body members 18 and 19.

This heating medium passage 121 is formed in an arc shape surrounding the valve body 36 and the valve seat 34 when viewed from a direction along the axis of the valve shaft 35 in the valve mechanism 20, is disposed at substantially the same position as the valve seat 34 in a direction along the axis of the valve shaft 35, and is disposed so as to surround the fitting projection 18a of the first body member 18 further inward than the annular seal member 69 disposed between the first and second body members 18 and 19.

Moreover, a groove 122 is provided in at least one of joining faces of the first and second body members 18 and 19, in this embodiment the joining face of the second body member 19 to the first body member 18, the groove 122 forming the heating medium passage 121 between the first and second body members 18 and 19.

The groove 122 is formed in an arc shape coaxially surrounding the fitting hole 66, peripherally opposite ends of the groove 122 being disposed in a portion corresponding to the exit side connection hole 73, shallow groove portions 122a and 122b of the groove 122, which are shallow so as not to interfere with the outlet passage 72 and the exit side connection hole 73, are formed in portions corresponding to the outlet passage 72 and the exit side connection hole 73 in peripherally opposite end portions of the groove 122, and a shallow groove portion 122c of the groove 122, which is shallow so as not to interfere with the valve hole 78 and the mounting hole 79, is formed in a portion corresponding to the valve hole 78 and the mounting hole 79 for the relief valve 21 in a peripherally middle part of the groove 122.

The first body member 18 is provided with a medium inlet passage 123 and a medium outlet passage 124 so as to extend vertically, the medium inlet passage 123 communicating with one peripheral end of the heating medium passage 121, the medium outlet passage 124 communicating with the other peripheral end of the heating medium passage 121, and an inlet pipe (not illustrated) communicating with the medium inlet passage 123 and an outlet pipe 125 (see FIG. 1) communicating with the medium outlet passage 124 are connected to the lower end of the first body member 18 so as to extend downward.

The operation of this embodiment is now explained. The valve mechanism 20 is mounted on the first body member 18 of the body 16 so as to be disposed between the high pressure chamber 37 and the pressure-reducing chamber 38, and since the valve mechanism unit 51, which is formed by pre-mounting the filter 46 fitted and supported on the valve guide member 30 and the valve seat member 31 so as to be disposed between the high pressure chamber 37 and the valve chamber 32 on the valve mechanism 20 having the valve body 36, the valve shaft 35, the valve guide member 30, and the valve seat member 31, is mounted on the first body member 18 of the body 16, it is possible to prevent foreign matter from entering the valve chamber 32 when storing or transporting the valve mechanism unit 51 or when assembling the valve mechanism unit 51 to the body 16. Moreover, it is possible to check the state in which the filter 46 is fitted to the valve mechanism 20 before assembling it to the body 16, thus ensuring reliable fitting of the filter 46 and enabling it to be mounted on the body 16.

Furthermore, since the annular clamping faces 41 and 42, which oppose each other in a direction along the axes of the guide hole 29 and the valve hole 33, are formed on the valve guide member 30 having the guide hole 29 and the valve seat member 31 having the valve hole 33 respectively, and the filter 46 formed in a cylindrical shape having opposite ends abutting against the two clamping faces 41 and 42 is clamped between the two clamping faces 41 and 42, it is possible to easily and reliably carry out positioning and fixing of the filter 46 relative to the valve mechanism 20.

Moreover, since the valve guide member 30 and the valve seat member 31 are joined by press-fitting, it is unnecessary to use a member other than the valve guide member 30 and the valve seat member 31 for joining, and the valve guide member 30 and the valve seat member 31 can be joined simply and reliably.

Furthermore, since the filter 46 is formed from a synthetic resin, metal swarf is not generated when mounting the filter 36 on the valve guide member 30 and the valve seat member 31 and, moreover, since the filter 46 is formed by providing, on the synthetic resin filter frame 47 formed in a cylindrical shape and provided with the passage windows 49, the filter elements 48 covering the passage windows 49, it is possible to guarantee the strength of the filter 46 by means of the filter frame 47.

Moreover, since the outer periphery of the valve seat member 31 is lightly press-fitted into the inner periphery of one end of the filter frame 47 surrounding part of the valve guide member 30 and the valve seat member 31, it is possible to make the inner periphery of the one end of the filter 46 come into intimate contact with the valve seat member 31, thus making it possible to prevent foreign matter from entering from between the one end of the filter 46 and the valve seat member 31.

Furthermore, since the projections 50, which are flattened by being abutted against the clamping face 41 when clamping the filter frame 47 between the two clamping faces 41 and 42, are projectingly provided integrally with one end in the axial direction of the filter frame 47, the filter frame 47 is urged to the other side in the axial direction by the resilient force of the projections 50 being flattened, and the other end in the axial direction of the filter frame 47 is strongly pressed against, among the two clamping faces 41 and 42, the clamping face 42, against which the other end in the axial direction of the filter frame 47 is abutted. That is, in addition to the inner periphery on one end in the axial direction of the filter frame 47 being in intimate contact with the valve seat member 31, the other end in the axial direction of the filter frame 47 is in intimate contact with the clamping face 42 of the valve seat member 31, and it is thus possible to prevent effectively foreign matter from entering from between the filter frame 47 and the valve guide member 30 and valve seat member 31. Moreover, since the projections 50 are projectingly provided at a plurality of positions spaced in the peripheral direction of the filter frame 47, by appropriately selecting the number of projections 50 and the arrangement thereof, it is possible to obtain an appropriate intimacy of contact while avoiding deformation of the filter frame 47.

Since the valve mechanism unit 51 is inserted into the housing hole 23 provided in the first body member 18 of the body 16 with the valve seat member 31 side first and mounted on the first body member 18, and the outer diameter of the end part of the filter frame 47 on the valve seat member 31 side is set so as to be larger than the outer diameter of the valve seat member 31, when the valve mechanism unit 51 is inserted into the housing hole 23 of the body 16 in order to mount it on the body 16, the synthetic resin filter frame 47 easily touches the inner face of the housing hole 23, thus avoiding contact between the valve seat member 31 and the body 16, which are made of metal, and thereby preventing the generation of metal swarf.

Furthermore, since the filter elements 48 are provided on the filter frame 47 so that their outer faces are at positions set back inward from the outer peripheral face of the filter frame 47, the filter elements 48 can be protected by the filter frame 47 and, in particular, the effect of protecting the filter elements 48 from contacting the body 16 when the valve mechanism unit 51 is mounted on the body 16 is enhanced.

The partition wall 64 is provided on the second body member 19 of the body 16 so as to be disposed between the pressure action chamber 88 and the pressure-reducing chamber 38 communicating with the pressure action chamber 88, one face of the diaphragm 28 facing the pressure action chamber 88, and the synthetic resin guide member 110 is mounted on the partition wall 64, the guide member 110 guiding axial movement of the diaphragm rod 96 connected to the valve shaft 35 of the valve mechanism 20 and coaxially fixed to the central part of the diaphragm 28. The guide member 110 is formed from a synthetic resin so as to integrally have the guide portion 110a, which is formed in a cylindrical shape so as to form the guide hole 111 having the diaphragm rod 96 slidably fitted thereinto and part of which is fitted into the through hole 112 provided in the partition wall 64, the extended portion 110b, which extends radially outwardly from the guide portion 110a, and the engagement portions 110c, which project from the extended portion 110b at positions spaced from the guide portion 110a, and the guide member 110 is mounted on the partition wall 64 so that the engagement portions 110c resiliently engage with the partition wall 64 of the second body member 19.

That is, since the guide member 110 is mounted on the partition wall 64 so that the cylindrical guide portion 110a, which forms the guide hole 111 into which the diaphragm rod 96 is slidably fitted, is fitted into the through hole 112 of the partition wall 64, and the engagement portions 110c projecting from the extended portion 110b at positions spaced from the guide portion 110a resiliently engage with the partition wall 64, it is difficult for deformation of the engagement portions 110c occurring when the guide member 110 is mounted on the partition wall 64 to be transmitted to the guide portion 110a, change of the internal diameter of the guide hole 111 is suppressed, and the precision of control of the gap between the diaphragm rod 96 and the guide member 110 is therefore improved.

Moreover, since the extended portion 110b is formed in a collar shape while protruding radially outward from the entire outer periphery of the guide portion 110a and having the face opposing the partition wall 64 as a flat face, and the ring-shaped projection 117 coaxially surrounding the guide portion 110a so as to be pressed against the partition wall 64 when the engagement portion 110c is resiliently engaged with the partition wall 64 is projectingly provided integrally with the face of the extended portion 110b opposing the partition wall 64, it is possible to guarantee the sealing properties between the guide member 110 and the partition wall 64.

Furthermore, since the engagement portions 110c are formed so as to be inserted into the engagement holes 113 provided in the partition wall 64 from one face of the partition wall 64 while flexing so as to resiliently engage with the other face of the partition wall 64, it is possible to reliably mount the guide member 110 on the partition wall 64, and since the plurality of engagement portions 110c having a rectangular cross-section in a plane perpendicular to the axis of the guide portion 110a resiliently engage with the plurality of engagement holes 113, when the engagement portions 110c pass through the engagement holes 113 they easily flex, thus enhancing the ease of assembly of the guide member 110.

Moreover, since the aspirator passage 114, which provides communication between the pressure-reducing chamber 38 and the pressure action chamber 88, is formed in the guide member 110 so as to run through the partition wall 64, it is possible to easily machine the aspirator passage 114, which is required to have a small diameter, so as to be formed in the synthetic resin guide member 110. Furthermore, since one end of the aspirator tube 115, which forms the aspirator passage 114 and is fitted into the aspirator hole 116 formed in the partition wall 64, is integrally provided with the extended portion 110b, and the other end of the aspirator tube 115 projects into the pressure-reducing chamber 38 in a state in which the guide member 110 is mounted on the partition wall 64 while the extended portion 110b is disposed on the pressure action chamber 88 side, it is possible to make the other end of the aspirator tube 115 face a portion where the gas flow rate is high within the pressure-reducing chamber 38, thereby improving the flow rate-pressure characteristics of the pressure-reducing valve. Moreover, since the aspirator tube 115 is molded at the same time as the guide member 110 is molded from a synthetic resin, the aspirator tube 115 can easily be provided on the guide member 110. Furthermore, since the aspirator passage 114 is formed at the same time as when die-molding the guide member 110, it is possible to reduce the machining cost and machining time.

Furthermore, since the ring-shaped projection 117 projectingly provided on the extended portion 110b surrounds the engagement portions 110c provided at a plurality of positions of the extended portion 110b, and the aspirator hole 116 is provided in the partition wall 64 at a position further inward than the projection 117, it is possible to guarantee the sealing properties of the positions where the plurality of engagement portions 110c engage with the partition wall 64 and the part where the aspirator tube 115 is fitted into the aspirator hole 116.

Moreover, since the stopper portion 110d protruding radially outward from the end part of the guide portion 110a on the diaphragm 28 side is integrally provided with the guide member 110 so as to restrict displacement of the diaphragm 28 toward the side that reduces the volume of the pressure action chamber 88, it is possible to alleviate the impact during restriction by restricting the displacement of the diaphragm 28 by means of the stopper portion 110d, which is provided integrally with the synthetic resin guide member 110 and has relatively wide area, and it is also possible to make it easy to form the stopper portion 110d.

Furthermore, since the plurality of ribs 110e extending radially from the outer periphery of the guide portion 110a so as to provide a connection between the extended portion 110b and the stopper portion 110d are integrally provided with the guide member 110, it is possible to enhance the rigidity of the guide portion 110a itself and the portions where the extended portion 110b and the stopper portion 110d are connected to the guide portion 110a, and improve the precision with which the diaphragm rod 96 is guided by the guide member 110.

Moreover, the diaphragm 28 is formed from the disk-shaped rubber sheet for which the thickness of at least the peripheral edge part and the central part thereof is uniform in the natural state, and in this embodiment the entire diaphragm 28 is formed in a disk shape having a uniform thickness in the natural state. Because of this, die-molding of the diaphragm 28 is unnecessary, thus reducing the cost.

Moreover, the diaphragm cover 17, which integrally has the bottomed cylindrical portion 17a having the end wall portion 17aa in the end part on the side opposite to the diaphragm 28 and the collar portion 17b protruding radially outward from the open end of the bottomed cylindrical portion 17a, is fixed to the body 16 so as to compressively hold the peripheral edge part of the diaphragm 28 between the collar portion 17b and the clamping face 91 of the body 16, and in a state in which the diaphragm cover 17 is fixed to the body 16 the arrangement is such that, of the gap between the collar portion 17b and the clamping face 91 of the body 16, the portion having the minimum gap Ctmin is positioned further inward in the radial direction of the diaphragm 28 than the portion having the maximum gap Ctmax.

Therefore, although the peripheral edge part of the diaphragm 28 has a flat shape without a thick seal portion, it is possible to improve the sealing properties between the diaphragm 28 and the collar portion 17b and clamping face 91 due to the diaphragm 28 being compressed in the portion having a minimum gap Ctmin by the relatively large load between the collar portion 17b and the clamping face 91 of the body 16; moreover, when a radially inward tensile load acts on the peripheral edge part of the diaphragm 28, in order for a portion of the diaphragm 28 that is present further radially outward than the portion having the minimum gap Ctmin to pass through the portion with the minimum gap between the collar portion 17b and the clamping face 91, it is necessary for it to be compressed, thus improving the pull-out resistance load for the diaphragm 28.

Moreover, the diaphragm cover 17 is formed by pressforming of a metal sheet, thus achieving a reduction in the size and weight of the diaphragm cover 17 and thereby yet further reducing the cost.

Furthermore, whereas the clamping face 91, which is formed on the second body member 19 of the body 16 so as to compressively hold the diaphragm 28 between itself and the collar portion 17b of the diaphragm cover 17, is formed flat along the plane perpendicular to the axis of the bottomed cylindrical portion 17a of the diaphragm cover 17 fixed to the body 16, the collar portion 17b of the diaphragm cover 17 is formed so as to be inclined so that it becomes further away from the clamping face 91 in going radially outward, and it is therefore possible to easily incline the collar portion 17b of the diaphragm cover 17 and impart resilience thereto, and it is also easy to set the gap between the collar portion 17b and the clamping face 91 so that the portion with the minimum gap Ctmin is positioned further inward in the radial direction of the diaphragm 28 than the portion with the maximum gap Ctmax.

Moreover, since the diaphragm cover 17 is fixed to the body 16 further radially outward than the portion having the minimum gap Ctmin so that the collar portion 17b can resiliently deform in order to exhibit a resilient force for pressing the diaphragm 28 against the clamping face 91 side via the portion having the minimum gap Ctmin, it is possible to prevent the sealing properties between the collar portion 17b and body 16 and the diaphragm 28 from being degraded due to the rubber diaphragm deteriorating due to the influence of heat, etc. and the resilient force of the diaphragm weakening. That is, since the collar portion 17b exhibits a resilient force for pressing the diaphragm 28 to the clamping face 91 side via the portion with the minimum gap Ctmin, it is possible to guarantee the sealing properties by means of the collar portion 17b resiliently deforming to the side where it approaches the body 16 by a portion corresponding to the decrease in the resilient force of the diaphragm 28.

Moreover, since the clamping face 91 is formed from the flange portion 19a, which is integrally provided with the second body member 19 forming part of the body 16, the diaphragm cover 17 integrally has the cylindrical positioning tubular portion 17c, which is connected to the outer periphery of the collar portion 17b so as to carry out positioning of the diaphragm cover 17 relative to the body 16 by abutting against the outer periphery of the flange portion 19a, and the tip portion of the positioning tubular portion 17c is swaged radially inward so as to form the engagement portion 17d engaging with the flange portion 19a, when the diaphragm cover 17 is fixed to the body 16 it is unnecessary to employ a component exclusively used therefor other than the diaphragm cover 17, thus decreasing the number of components and reducing the cost and, moreover, compared with fixing by tightening, the number of assembly steps is reduced, thus enabling excellent productivity to be achieved.

Furthermore, since the grooves 93 having a substantially V-shaped cross-section are formed in at least one of the clamping face 91 and the face of the collar portion 17b on the clamping face 91 side, in this embodiment the clamping face 91, so that part of the diaphragm 28 sinks into the grooves 93, it is possible to enhance the sealing properties and pull-out resistance load for the diaphragm 28 by making part of the diaphragm 28 sink into the grooves 93. Moreover, in this embodiment, since, of the gap between the clamping face 91 and the collar portion 17b of the diaphragm cover 17, the grooves 93 are disposed in a portion having the minimum gap Ctmin, it is possible to further enhance the sealing properties and the pull-out resistance load for the diaphragm 28 by making part of the diaphragm 28 sink deeper into the grooves 93.

Furthermore, since the bottomed cylindrical portion 17a of the diaphragm cover 17 integrally has the end wall portion 17aa, a cylindrical guide tube portion 17ab having one end provided so as to be connected to the outer periphery of the end wall portion 17aa in order to guide the outer periphery of an end part, on the end wall portion 17aa side, of the coil-shaped spring 90, a tapered tubular portion 17ac formed in a tapered shape provided so as to be connected to the other end of the guide tube portion 17ab, and a large diameter tubular portion 17ad having one end connected to the large diameter end of the tapered tubular portion 17ac and the other end connected to the collar portion 17b, it is possible to make the structure of the bottomed cylindrical portion 17a simple, thus decreasing the number of machining steps when press-forming the diaphragm cover 17 and reducing the machining cost; when the diaphragm cover 17 is assembled to the body 16 side, even if the diaphragm cover 17 and the axis of the spring 90 provided in a compressed state between the diaphragm 28 and the end wall portion 17aa of the diaphragm cover 17 are slightly displaced due to the spring 90 being tilted, etc., since the spring 90 is guided to the guide tube portion 17ab via the taper-shaped tapered tubular portion 17ac, it is possible to smoothly and reliably arrange the spring 90 at the correct position where its axis matches up with the diaphragm cover 17.

Furthermore, formed on the flange portion 19a provided on the second body member 19 of the body 16 are the clamping face 91 and the chamfered portion 92 inclined so that it becomes further away from the collar portion 17b of the diaphragm cover 17 in going radially outward and connected to the outer periphery of the clamping face 91 so as to allow the peripheral edge end part of the diaphragm 28 to run thereonto. Since the diaphragm cover 17 is fixed to the flange portion 19a radially outward of the chamfered portion 92, when a radially inward tensile load acts on the outer peripheral edge part of the diaphragm 28, it is necessary for the peripheral edge end part of the diaphragm 28 to pass through between the collar portion 17b and the clamping face 91 via a radially inward portion where the gap is smaller than the chamfered portion 92 and be compressed, thus improving the pull-out resistance load for the diaphragm 28.

Furthermore, the shaft portion 96b, which is inserted into the central part of the diaphragm 28 so as to form the annular step portion 96a facing the diaphragm 28 side on the pressure action chamber 88 side, is coaxially and integrally provided with the diaphragm rod 96 connected to the central part of the diaphragm 28. The first retainer 94, which is formed in a ring shape so as to allow the shaft portion 96b to be passed through and has the annular seal member 98 between itself and the step portion 96a, abuts against the central part of the diaphragm 28 on the pressure action chamber 88 side, the second retainer 95, which is formed in a ring shape so as to allow the shaft portion 96b to be passed through and holds the central part of the diaphragm 28 between itself and the first retainer 94, abuts against the central part of the diaphragm 28 on the spring chamber 89 side, the nut 101, which holds the second retainer 95, the diaphragm 28, the first retainer 94, and the seal member 98 between itself and the step portion 96a, is screwed around the male thread 97 cut into the outer periphery of the shaft portion 96b, and in a state in which the nut 101 is screwed and tightened around the male thread 97, the minimum gap portion Cdmin is positioned further outward in the radial direction of the diaphragm 28 than the maximum gap portion Cdmax.

Therefore, although the central part of the diaphragm 28 has a flat shape without a thick seal portion, it is possible to improve the sealing properties between the central part of the diaphragm 28 and the first and second retainers 94 and 95 due to the diaphragm 28 being compressed between the first and second retainers 94 and 95 in the portion having the minimum gap Cdmin by a relatively large load; moreover, when a radially outward tensile load acts on the central part of the diaphragm 28, in order for a portion of the diaphragm 28 that is present further radially inward than the portion having the minimum gap Cdmin to pass through between the first and second retainers 94 and 95 via the portion with the minimum gap Cdmin, it is necessary for it to be compressed, thus improving the pull-out resistance load for the diaphragm 28.

Moreover, the grooves 104 and 105 having a substantially V-shaped cross-section are formed in at least one of the face of the first retainer 94 on the diaphragm 28 side and the face of the second retainer 95 on the diaphragm 28 side, in this embodiment in the face of the first retainer 94 on the diaphragm 28 side, so that part of the diaphragm sinks thereinto, thereby enhancing the sealing properties and the pull-out resistance load for the diaphragm 28.

Moreover, since the central parts of the first and second retainers 94 and 95, which are made of metal, abut against each other directly or via the metal washer 107, even when the diaphragm deteriorates due to the influence of heat, etc. and the resilient force of the diaphragm is weakened, the gap between the first and second retainers 94 and 95 does not change, the nut 101 is not loosened, and it is therefore possible to reliably maintain the connection of the diaphragm rod 96 to the central part of the diaphragm 28.

An embodiment of the present invention is explained above, but the present invention is not limited to the embodiment above, and may be modified in a variety of ways as long as the modifications do not depart from the present invention described in Claims.

The invention claimed is:

1. A pressure-reducing valve in which a peripheral edge part of a diaphragm is clamped between a body housing a valve mechanism and a diaphragm cover fixed to the body, the diaphragm forming a pressure action chamber between the diaphragm and the body and forming a spring chamber between the diaphragm and the diaphragm cover, a spring housed in the spring chamber is provided in a compressed state between the diaphragm cover and the diaphragm, and a diaphragm rod connected to a central part of the diaphragm is connected to a valve body of the valve mechanism, wherein the diaphragm is formed from a disk-shaped rubber sheet and a sheet thickness of at least the peripheral edge part of the diaphragm is uniform in a natural state, the diaphragm cover integrally has a bottomed cylindrical portion having an end wall portion in an end part opposite the diaphragm and a collar portion protruding radially outward from an open end of the bottomed cylindrical portion, the body is formed with a clamping face holding the peripheral edge part of the diaphragm (28) between the clamping face and the collar portion, the clamping face has a chamfered portion positioned radially outward on an outer periphery of the clamping face with the peripheral edge end part of the diaphragm extending over the chamfered portion, the diaphragm cover is fixed to the body radially outward of the chamfered portion and the peripheral edge part of the diaphragm is compressively held between the clamping face and the collar portion at a position radially inward of the chamfered portion.

2. A pressure-reducing valve in which a peripheral edge part of a diaphragm is clamped between a body housing a valve mechanism and a diaphragm cover fixed to the body, the diaphragm forming a pressure action chamber between the diaphragm and the body and forming a spring chamber between the diaphragm and the diaphragm cover, a spring housed in the spring chamber is provided in a compressed state between the diaphragm cover and the diaphragm, and a diaphragm rod connected to a central part of the diaphragm is connected to a valve body of the valve mechanism, wherein the diaphragm is formed from a disk-shaped rubber sheet and a sheet thickness of at least its central part is uniform in a natural state, the diaphragm rod is provided coaxially and integrally with a shaft portion passing through the central part of the diaphragm so as to form an annular step portion facing toward the diaphragm side on the pressure action chamber side, the diaphragm has its central part abutting against a first retainer on the pressure action chamber side, the first retainer being formed in a ring shape so as to allow the shaft portion to be passed through and having an annular seal member disposed between the first retainer and the step portion, the diaphragm has its central part abutting against a second retainer on the spring chamber side, the second retainer being formed in a ring shape so as to allow the shaft portion to be passed through and clamping the central part of the diaphragm between the second retainer and the first retainer, a nut is screwed around a male thread cut in an outer periphery of the shaft portion, the nut holding the second retainer, the diaphragm, the first retainer, and the seal member between the nut and the step portion, and a gap between the first and second retainers has a minimum gap section and a maximum gap section which are defined by forming an inclined face on one of the first and second retainers, the minimum gap section being positioned further outward in a radial direction of the diaphragm than the maximum gap section, and the diaphragm is compressed at the minimum gap section.

3. The pressure-reducing valve according to claim 2, wherein a groove having a substantially V-shaped cross-section is formed in at least one of a face of the first retainer on the diaphragm side and a face of the second retainer on the diaphragm side so that part of the diaphragm sinks into the groove.

4. The pressure-reducing valve according to claim 2 or 3, wherein central parts of the first and second retainers which are made of metal, are abutted against each other directly or via a metal washer at faces which extend orthogonally to an axis of the diaphragm rod.

5. The pressure-reducing valve according to claim 1, wherein the sheet thickness of the diaphragm at a peripheral edge part is uniform in a natural state, the diaphragm cover integrally has a bottomed cylindrical portion having an end wall portion in an end part opposite the diaphragm and a collar portion protruding radially outward from an open end of the bottomed cylindrical portion, and in a state in which the diaphragm cover is fixed to the body with the peripheral edge part of the diaphragm compressively held between the collar portion and a clamping face formed on the body, and a gap between the collar portion and the clamping face has a minimum gap portion and a maximum gap portion, the minimum gap portion being positioned radially inward of the maximum gap portion.

* * * * *